United States Patent
Mani et al.

(10) Patent No.: US 10,045,291 B2
(45) Date of Patent: Aug. 7, 2018

(54) RELAY FUNCTIONALITY OF BATTERY POWERED DEVICES

(71) Applicant: Itron, Inc., Liberty Lake, WA (US)

(72) Inventors: Mehdi Mani, Paris (FR); Hartman Van Wyk, Montloius sur Loire (FR)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 14/796,189

(22) Filed: Jul. 10, 2015

(65) Prior Publication Data

US 2016/0021613 A1    Jan. 21, 2016

Related U.S. Application Data

(60) Provisional application No. 62/025,346, filed on Jul. 16, 2014.

(51) Int. Cl.
*H04W 52/02* (2009.01)
*H04W 4/80* (2018.01)
(Continued)

(52) U.S. Cl.
CPC ........ *H04W 52/0209* (2013.01); *G01D 4/002* (2013.01); *H04Q 9/00* (2013.01);
(Continued)

(58) Field of Classification Search
None
See application file for complete search history.

(56) References Cited

U.S. PATENT DOCUMENTS

| 4,817,131 A | 3/1989 | Thornborough et al. |
| 6,018,667 A | 1/2000 | Ghosh et al. |

(Continued)

FOREIGN PATENT DOCUMENTS

| EP | 2661112 | 11/2013 |
| WO | WO2012174152 | 12/2012 |

OTHER PUBLICATIONS

Banerjee, et al., "An Energy-Efficient Architecture for DTN Throwboxes", INFOCOM 2007, 26th IEEE International Conference on Computer Communications, May 1, 2007, pp. 776-784.
(Continued)

*Primary Examiner* — Jamal Javaid
*Assistant Examiner* — Saad Khawar
(74) *Attorney, Agent, or Firm* — Lee & Hayes, PLLC

(57) ABSTRACT

Disclosed are techniques to minimize the electricity consumption of battery powered devices during network communications and performance of other functions. Example techniques include efficiently discovering other mains powered and battery powered devices within communication range of the battery powered device. In another example, techniques enable a battery powered device to serve as a relay for one or more other battery powered devices. In another example, techniques ensure that transmissions to and/or from battery powered devices are delivered efficiently and with low latency. In yet another example, techniques determine whether and under what conditions a battery powered device should migrate from one network to another. In the event of migration, example techniques minimize battery consumption associated with the migration.

16 Claims, 24 Drawing Sheets

(51) Int. Cl.
*G01D 4/00* (2006.01)
*H04W 56/00* (2009.01)
*H04Q 9/00* (2006.01)
*H04W 8/00* (2009.01)
*H04L 29/08* (2006.01)

(52) U.S. Cl.
CPC ............. *H04W 4/80* (2018.02); *H04W 8/005* (2013.01); *H04W 56/001* (2013.01); *G01D 4/004* (2013.01); *H04L 67/12* (2013.01); *H04Q 2209/60* (2013.01); *Y02B 90/242* (2013.01); *Y02B 90/246* (2013.01); *Y04S 20/322* (2013.01); *Y04S 20/42* (2013.01)

(56) References Cited

U.S. PATENT DOCUMENTS

| | | | |
|---|---|---|---|
| 7,797,009 | B2 | 9/2010 | Kiiskila et al. |
| 7,961,740 | B2 | 6/2011 | Flammer, III et al. |
| 8,964,762 | B2 | 2/2015 | Hui et al. |
| 9,137,350 | B2 | 9/2015 | Lamb |
| 9,256,908 | B2 | 2/2016 | Dai et al. |
| 2002/0123345 | A1 | 9/2002 | Mahany et al. |
| 2003/0181203 | A1 | 9/2003 | Cheshire |
| 2005/0143123 | A1 | 6/2005 | Black et al. |
| 2005/0176414 | A1 | 8/2005 | Steele et al. |
| 2006/0224335 | A1 | 10/2006 | Borleske et al. |
| 2008/0095075 | A1 | 4/2008 | Monier |
| 2011/0122933 | A1* | 5/2011 | Adam ................ H04B 7/15592 375/219 |
| 2012/0026941 | A1 | 2/2012 | Ahmad et al. |
| 2012/0092184 | A1 | 4/2012 | Carr et al. |
| 2012/0182966 | A1 | 7/2012 | Das et al. |
| 2012/0269115 | A1 | 10/2012 | Esteves et al. |
| 2012/0289158 | A1 | 11/2012 | Palin et al. |
| 2013/0106616 | A1 | 5/2013 | Gustafsson et al. |
| 2013/0121263 | A1 | 5/2013 | Nguyen et al. |
| 2013/0176902 | A1 | 7/2013 | Wentink et al. |
| 2013/0235791 | A1* | 9/2013 | Abraham ............... H04W 76/02 370/315 |
| 2013/0252548 | A1 | 9/2013 | Levy et al. |
| 2013/0294284 | A1 | 11/2013 | Popa et al. |
| 2014/0029415 | A1 | 1/2014 | Osterloh et al. |
| 2014/0112194 | A1* | 4/2014 | Novlan ................ H04W 8/005 370/254 |
| 2014/0169152 | A1 | 6/2014 | Nelson et al. |
| 2014/0199963 | A1 | 7/2014 | Mohebbi |
| 2015/0043384 | A1* | 2/2015 | Hui ......................... H04L 41/12 370/255 |
| 2015/0163828 | A1 | 6/2015 | Vandwalle et al. |
| 2015/0373766 | A1 | 12/2015 | Morita |
| 2016/0014664 | A1 | 1/2016 | Singh et al. |
| 2016/0019663 | A1 | 1/2016 | Mani et al. |
| 2016/0021433 | A1 | 1/2016 | Mani et al. |
| 2016/0021525 | A1 | 1/2016 | Mani et al. |
| 2016/0316354 | A1* | 10/2016 | Matsumura ........... H04W 8/005 |

OTHER PUBLICATIONS

Jun, et al., "Hierarchical Power Management in Disruption Tolerant Networks Using Traffic-Aware Optimization", Computer Communications, vol. 32, No. 16, Oct. 15, 2009, pp. 1710-1723.

Kondepu, et al., "Dual-Beacon Mobile-Node Discovery in Sparse Wireless Sensor Networks", IEEE Symposium on Computes and Communications (ISCC), Jun. 28, 2011, 2011, pp. 796-801.

The PCT Invitation to Pay Additional Fees for PCT application No. PCT/US2015/040419, 8 pages.

The PCT Invitation to Pay Additional Fees dated Oct. 20, 2015 for PCT application No. PCT/US2015/040434, 7 pages.

The PCT Search Report and Written Opinion dated Oct. 12, 2015 for PCT application No. PCT/US2015/040443, 9 pages.

The PCT Sea,rch Report and Written Opinion dated Oct. 2, 2015 for PCT application No. PCT/US/040448, 13 pages.

Sum, et al., "Enhanced Beaconless Synchronization for Regulatory Domain Specific IEEE 802.15.4g Smart Utility Networks", Vehicular Technology Conference (VTC Fall), Sep. 3, 2012, IEEE, 2012, pp. 1-6.

Office action for U.S. Appl. No. 14/796,762, dated Jul. 11, 2016, Mani et al., "Network Discovery by Battery Powered Devices",34 pages.

Office action for U.S. Appl. No. 14/796,762, dated Dec. 7, 2016, Mani et al., "Network Discovery by Battery Powered Devices",38 pages.

The PCT Search Report and Written Opinion dated Jan. 13, 2016 for PCT application No. PCT/US2015/040434, 19 pages.

PCT Search Report and Written Opinion dated Dec. 23, 2015 for PCT Application No. PCT/US15/40419, 21 pages.

Office action for U.S. Appl. No. 14/796,762, dated Apr. 12, 2017, Mani et al., "Network Discovery by Battery Powered Devices",35 pages.

The Australian Office Action dated Nov. 30, 2017 for Australian Patent Application No. 2015289756, a counterpart foreign application of U.S. Appl. No. 14/796,189, 3 pages.

The European Office Action dated Feb. 2, 2018 for European Patent Application No. 15747290.3, a foreign counterpart application of U.S. Pat. No. 9,456,258, 4 pages.

The Australian Office Action dated Feb. 20, 2018 for Australian Patent Application No. 2015289748, a counterpart foreign application of U.S. Pat. No. 9,860,730, 17 pages.

The Australian Office Action dated Mar. 13, 2018 for Australian Patent Application No. 2015289764, a counterpart foreign application of U.S. Pat. No. 9,456,258, 3 pages.

\* cited by examiner

RELAY FUNCTIONALITY OF BATTERY POWERED DEVICES

This application claims the benefit of priority to U.S. Provisional Application No. 62/025,346, filed on Jul. 16, 2014, which is incorporated herein by reference.

BACKGROUND

Utility meters such as electric, water and gas meters have evolved from isolated devices that simply measure utility consumption and display a consumption reading to so called "smart meters" that are connected devices capable of reporting resource consumption readings automatically over a utility communication network. Some meters, such as electric meters, are powered by alternating current electricity service ("mains power") from the electricity grid. Other devices, such as many water and gas meters, are battery powered. In many cases, such battery powered devices are expected to operate for extended periods of time (twenty years or more) without being recharged.

The capabilities of smart meters are continuously growing. Many of the added capabilities of smart meters come with increased energy demands on the meter. However, battery technologies have not kept pace with the increased energy demands. For this reason, battery powered smart meters have not been able to adopt many of the new capabilities that have been possible for mains powered devices because doing so would shorten their battery life. Consequently, battery powered smart meters have had more limited functionality than their mains powered counterparts, and have been unable to join certain types of communication networks. Other battery powered devices have faced similar challenges of increasing functionality and communication ability without sacrificing battery life.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, battery powered smart meters and other battery powered devices have been limited in their ability to provide desired functionality and connectivity without sacrificing battery life. This disclosure describes techniques to minimize the electricity consumption of battery powered devices during network communications and performance of other functions. For instance, in one example, the disclosure describes techniques for efficiently discovering other mains powered and battery powered devices within communication range of the battery powered device. In another example, the disclosure describes techniques enabling a battery powered device to serve as a relay for one or more other battery powered devices. In another example, the disclosure describes techniques for ensuring that transmissions to and/or from battery powered devices are delivered efficiently and with low latency. In yet another example, the disclosure describes techniques for determining whether and under what conditions a battery powered device should migrate from one network to another. In the event of migration, the disclosure also describes example techniques to minimize battery consumption associated with the migration. These and other techniques described herein allow battery powered devices to perform functions and communicate in ways that were not previously possible.

Many of the examples described in the disclosure are given in the context of an advanced metering infrastructure (AMI) of a utility communication network. However, the techniques described herein are not limited to use in a utility industry AMI. Rather, unless specifically described to the contrary, the techniques described herein applicable to any other communications network, control network, and/or other type of network or system that includes battery powered network communication devices. By way of example and not limitation, network communication devices include utility meters (e.g., electricity, water, or gas meters), relays, repeaters, routers, transformers, sensors, switches, encoder/receiver/transmitters (ERTs), appliances, personal computers (e.g., desktop computers, laptop computers, etc.), mobile devices (smartphones, tablets, etc.), servers, access points, or the like. Battery powered network communication devices (or "battery powered devices") are network communication devices that rely on a battery for power (i.e., are not connected to mains power).

Example Environment

Figure 1:
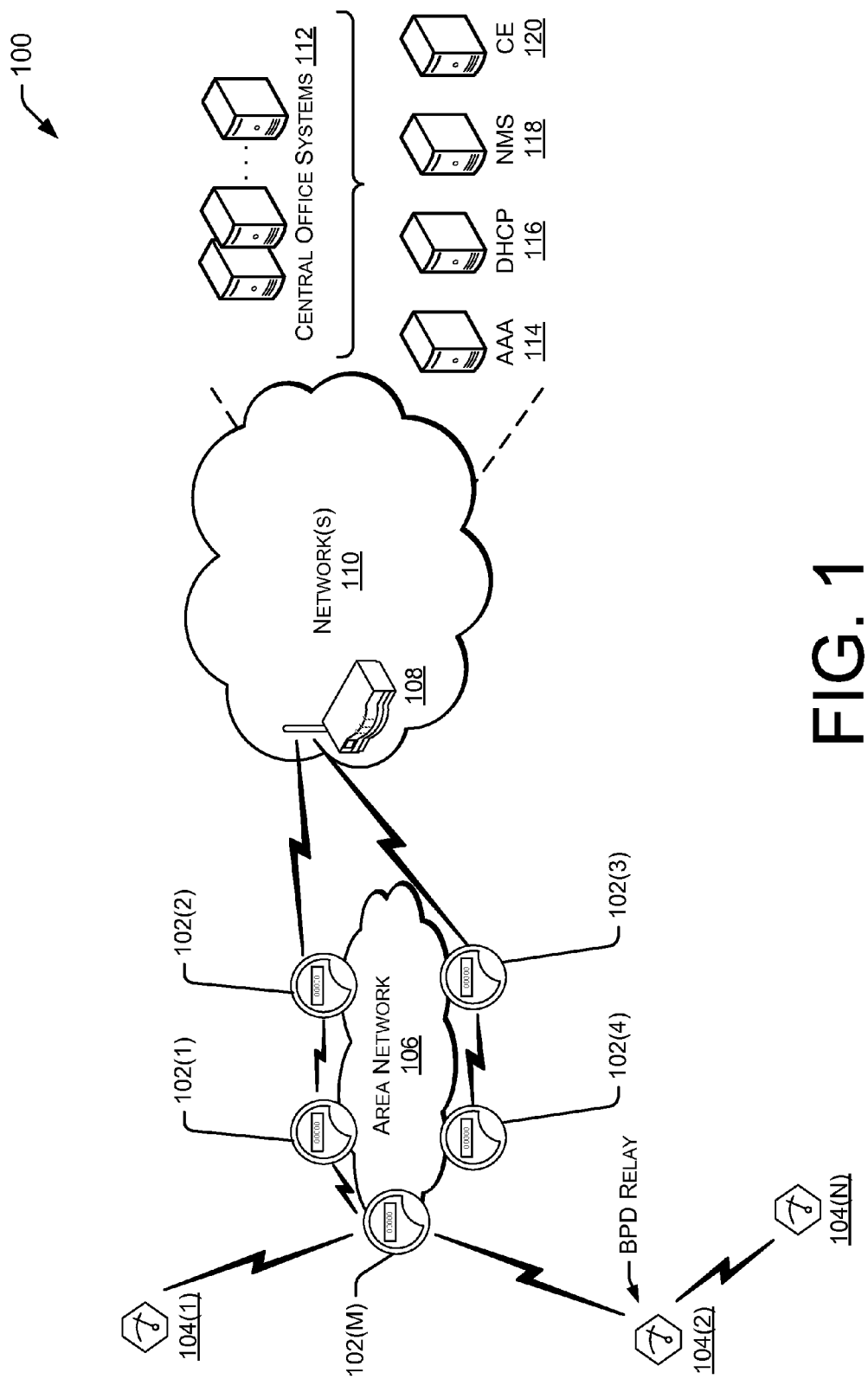
FIG. 1 is a schematic diagram of an example network architecture, including mains powered devices (MPDs) and battery powered devices (BPDs).

FIG. 1 is a diagram illustrating an example networked environment or architecture 100. The architecture 100 includes multiple network communication devices. The network communication devices include mains powered devices 102(1), 102(2), 102(3), 102(4), . . . 102(M) (collectively referred to as "mains powered devices 102" or "MPDs 102"), and battery powered devices 104(1), 104(2), . . . 104(N) (collectively referred to as "battery powered devices 104" or "BPDs 104"), where M and N are any integers greater than or equal to 1 and may be the same number or different numbers. In the illustrated example, the mains powered devices (MPDs) are representative of electricity meters, while the battery powered devices (BPDs) are representative water meters and/or gas meters. However, as noted above, in other examples, the MPDs and BPDs may comprise other types of mains powered and battery powered devices, respectively.

The network communication devices are in communication with one another via an area network (AN) 106. As used herein, the term "area network" refers to a defined group of devices that are in communication with one another via one or more wired or wireless links. Examples of area networks include, for example, local area networks (LANs), neighborhood area networks (NANs), personal area networks (PANs), home area networks (HANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The plurality of channels may comprise a control channel and multiple data channels. In some instances, the control channel is utilized for communicating one or more messages between devices to specify one of the data channels to be utilized to transfer data. Generally, transmissions on the control channel are shorter relative to transmissions on the data channels. An area network may implement a channel hopping sequence, such that the control channel and data channels change over time.

In the illustrated example, the area network 106 comprises a mesh network, in which the network communication devices relay data through the network. Most of the examples given in this disclosure are given in terms of mesh networks. However, at least some of the techniques described herein are also applicable to other types of networks (e.g., star or hub-and-spoke networks, mobile networks, cellular networks, etc.). Additionally, in some instances, one or more devices may be able to communicate with multiple different types of networks (e.g., a mesh network and a star network) at the same or different times. For instance, as described later, if a device is unable to discover a suitable parent in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

The network communication devices also include an edge device 108, which serves as a connection point of the AN 106 to one or more backhaul networks 110, such as the Internet. The edge device 108 may include, but is not limited to, a field area router (FAR), a cellular relay, a cellular router, an edge router, a DODAG (Destination Oriented Directed Acyclic Graph) root, a root device or node of the AN, a combination of the foregoing, or the like. In this illustrated example, the edge device 108 comprises a FAR, which relays communions from the AN to one or more central office systems 112 via the network(s) 110. In the illustrated example, the central office systems 112 include a security service such as Authentication, Authorization and Accounting (AAA) server 114, a network registration service such as Dynamic Host Configuration Protocol (DHCP) server 116, a network management service (NMS) 118, and a collection engine (CE) 120. In various examples, network communication devices may register or interact with some or all of these central office systems 112. Each of these central office systems 112 is described further in later sections of the disclosure.

In other examples, the central office systems 112 may include additional or alternative systems such as a meter data management system (in the utility context), a customer relationship management system (in the sales context), a diagnostic system (in a manufacturing context), an inventory system (in a warehouse context), a patient record system (in the healthcare context), a billing system, etc.

The central office systems 112 may be physically located in a single central location, or may be distributed at multiple different locations. The central office systems 112 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

Referring back to FIG. 1, two ways in which BPDs can connect to area network (AN) 106 include (1) via connection directly with a mains powered device (MPD) or (2) via a battery powered device that acts as a relay (a BPD relay). Referring back to FIG. 1, in the first scenario, a battery powered water meter, BPD 104(1), discovers in its vicinity an electricity meter, MPD 102(M), connected to mains power. Because MPD 102(M) is connected to mains power, it has no practical energy constraints. BDP 104(1) may associate MPD 102(M) as its parent, in which case MPD 102(M) acts as the connecting point between BPD 104(1) and the central office systems 112. In the second scenario, a gas meter, BPD 104(N), discovers a battery powered water meter, BPD 104(2), which is already connected to the meshed AN 106 via MPD 102(M) and can play the role of a BPD relay. BPD 104(N) may associate this BPD-relay, BPD 104(2), as its parent to get connected to the AN 106.

Example Network Communications Devices

Figure 2A:
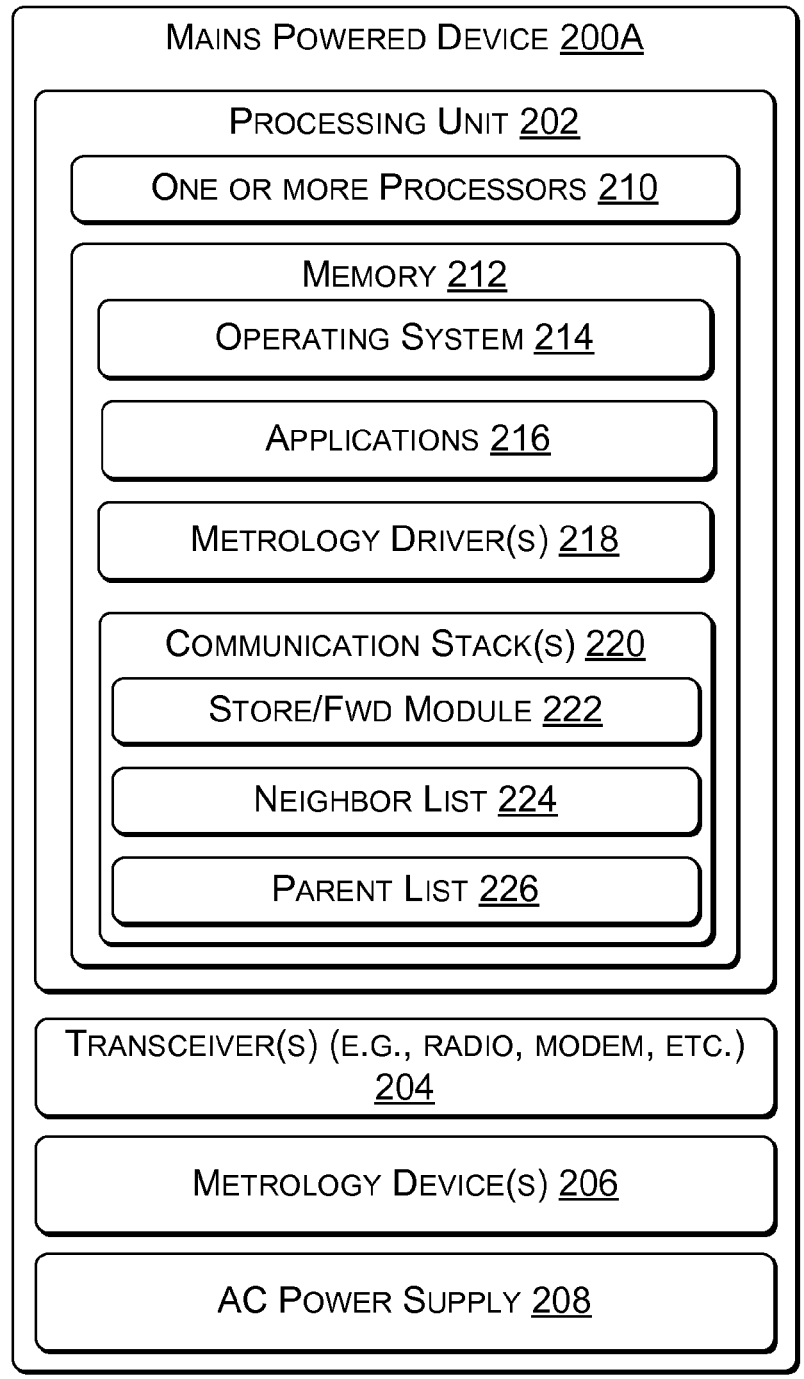
FIG. 2A is a schematic diagram showing example detail of a MPD.

FIG. 2A is a diagram showing details of an example mains powered device, MPD 200A. In this example, MPD 200A comprises an electricity meter. However, as discussed above, MPDs can take numerous different forms, depending on the industry and context in which they are deployed. Different types of MPDs may have different physical and/or logical components. For instance, utility meter MPDs such as that shown in FIG. 2A may have metrology components, whereas other types of MPDs may not.

As shown in FIG. 2A, the example MPD 200A includes a processing unit 202, a transceiver 204, one or more metrology devices 206, and an alternating current (AC) power supply 208 that couples to the AC mains power line wherein the MPD 200A is installed. The processing unit 202 may include one or more processors 210 and memory 212 and/or other hardware device(s), such as an application specific integrated circuit (ASIC), a gate array or other hardware-based logic device. When present, the processor(s) 210 may comprise microprocessors, central processing units, graphics processing units, or other processors usable to execute program instructions to implement the functionality described herein. Additionally or alternatively, in some examples, some or all of the functions described may be performed in hardware.

The transceiver 204 may comprises one or more hardware and/or software implemented radios to provide two-way RF communication with other network communication devices in the area network 106 and/or other computing devices via the network 110. The transceiver 204 may additionally or alternatively include a modem to provide power line communication (PLC) communication with other network communication devices that are connected to an electrical service grid.

The metrology device(s) 206 comprise the physical hardware and sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to the central office 112 via the transceiver 204. The consumption data may be formatted and/or packetized in a manner or protocol for transmission.

The memory 212 includes an operating system (OS) 214 and one or more applications 216 that are executable by the processor(s) 210. The memory 212 may also include one or more metrology drivers 218 configured to receive, interpret, and/or otherwise process the metrology data collected by the metrology device(s) 206. Additionally or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, and/or an 802.15.4g protocol. However, in other examples, other protocols may be used, depending on the networks with which the device is intended to be compatible. The communication stack(s) 220 describe the functionality and rules governing how the MPD 200A interacts each of the specified types of networks. For instance, the communication stack(s) 220 described in this disclosure cause MPDs and BPDs to operate in ways that minimize the battery consumption of BPDs when they are connected to these types of networks. Additional details of how the communication stack(s) 220 implement these operations are described throughout the disclosure.

The communication stack(s) 220 also include a store/forward module 222, which is usable to temporarily store data from transmissions that are destined for another device until such a time as the data can be forwarded to the device. In some examples, the store/forward module 222 may be configured to classify, prioritize, and forward data based on a variety of criteria. Examples of criteria the store/forward module may take into account include a type of the communication (e.g., unicast or multicast), a type of device to which the data is directed (e.g., MPD, BPD, etc.), and/or a priority of the information contained in the data (e.g., command/control, alarm, consumption data, software/firmware updates, etc.). Additional details of the store/forward module 222 will be described in later sections of the disclosure.

The memory 212 also includes a neighbor list 224 and/or a parent list 226. The neighbor list 224 includes a list of devices that are in a vicinity of the MPD 200A. Devices may be added to the neighbor list 224 as they are discovered by the MPD 200A. The parent list 226 includes a list of devices that are parents or potential parents of the MPD 200A. Potential parents are those devices that are closer to an edge or root of the area network 106 and are capable of acting as a parent of the MPD 200A. In this example, the neighbor list 224 and the parent list 226 are shown as separate lists. However, in other examples, the neighbor list 224 and parent list 226 may be combined in a single list. In some examples, the neighbor list 224, parent list 226, or other list maintained by the device may include current topology information of the surrounding network (e.g., parents of parents, siblings, two-hop neighbors, etc.), availability of one or more neighbors, availability of one or more channels, or the like.

Figure 2B:
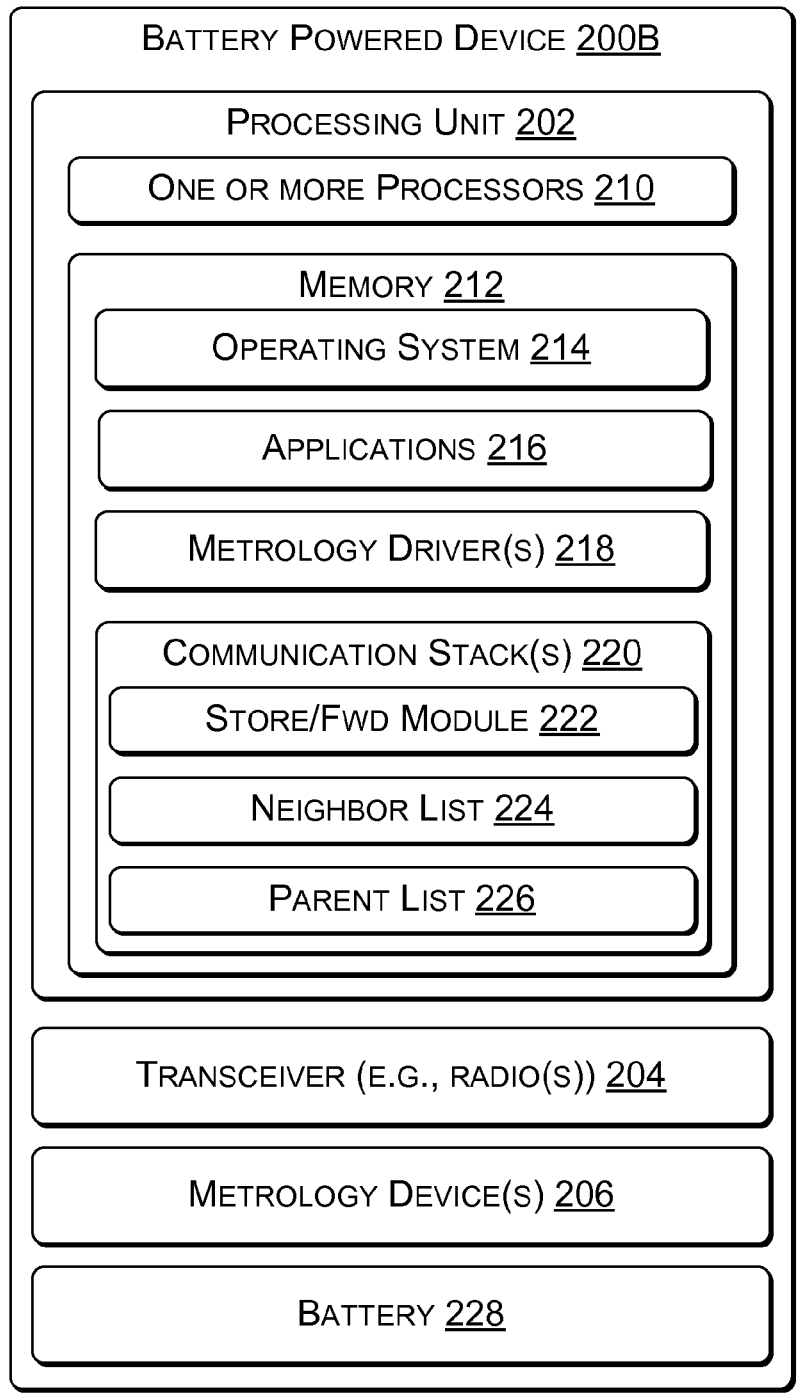
FIG. 2B is a schematic diagram showing example detail of a BPD.

FIG. 2B is a diagram showing details of an example battery powered device, BPD 200B. In this example, BPD 200B comprises a water meter or gas meter. However, as discussed above, BPDs can take numerous different forms, depending on the industry and context in which they are deployed. Different types of BPDs may have different physical and/or logical components. For instance, utility meter BPDs such as that shown in FIG. 2B may have metrology components, whereas other types of BPDs may not.

The BPD 200B of FIG. 2 is similar in many respects to the MPD 200A. To the extent that the MPD 200A and 200B include the same or similar components, the functions will not be repeated here. Therefore, the following discussion of the BPD 200B focuses on the differences between the BPD 200B and the MPD 200A. However, the differences highlighted below should not be considered to be exhaustive. One primary difference between the MPD 200A and the BPD 200B is that the BPD 200B includes a battery 228 instead of the mains power supply 208. The specific characteristics of the battery 228 may vary widely depending on the type of BPD. By way of example and not limitation, the battery 228 of the example water or gas meter of FIG. 2B may comprise a 3 volt Lithium Thionyl Chloride battery having an internal impedance rated at 130 Ohms or a 3 volt Lithium Manganese battery having an internal impedance rated at 15 Ohms.

Also, in some examples, even components with similar functions may be different for MPDs than for BPDs due to the different constraints. As one example, while both MPDs and BPDs have transceivers, the specific transceivers used may be different. For instance, a MPD transceiver may include a PLC modem while a BPD transceiver does not because the BPD is not connected to an electrical power line that could be used for PLC communications. Additionally or alternatively, a BPD transceiver may employ a lower power RF radio to minimize energy consumption.

Other differences between the MPD 200A and the BPD 200B relate to the functionality of the store/forward module 222. In the case of the MPD 200A, the store/forward module 222 only acts on the downstream traffic directed to BPDs (i.e., traffic in the direction from the MPD to its BPD children). In the case of the BPD 200B, the store/forward module 222 acts on both upstream and downstream traffic, but is only used when the BPD 200B is acting as a BPD relay. When the BPD 200B is not acting as a relay, it is not receiving transmissions that are intended for other devices so it need not use the store/forward module 222. Also, when the BPD 200B serves as a relay, the store/forward module 222 additionally takes into account the duty cycle of the BPD 200B due to characteristics of the battery 228 in determining when to forward transmissions.

The memory 212 of the MPD 200A and BPD 200B is shown to include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

While detailed examples of certain computing devices (e.g., MPD 200A and BPD 200B) are described above, it should be understood that even those computing devices not described in detail may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing The various memories described herein are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Example of Joining a Battery Powered Device to a Network

Before a gas or water meter or other battery powered device (BPD) can exchange data (e.g., resource consumption data, sensor data, etc.) over a meshed network, such as area network 106, the BPD must typically join the network. This section describes example processes that BPDs may use to join a meshed area network. The example processes described help to minimize consumption of battery power by the BPD when joining such a network.

Figure 3:
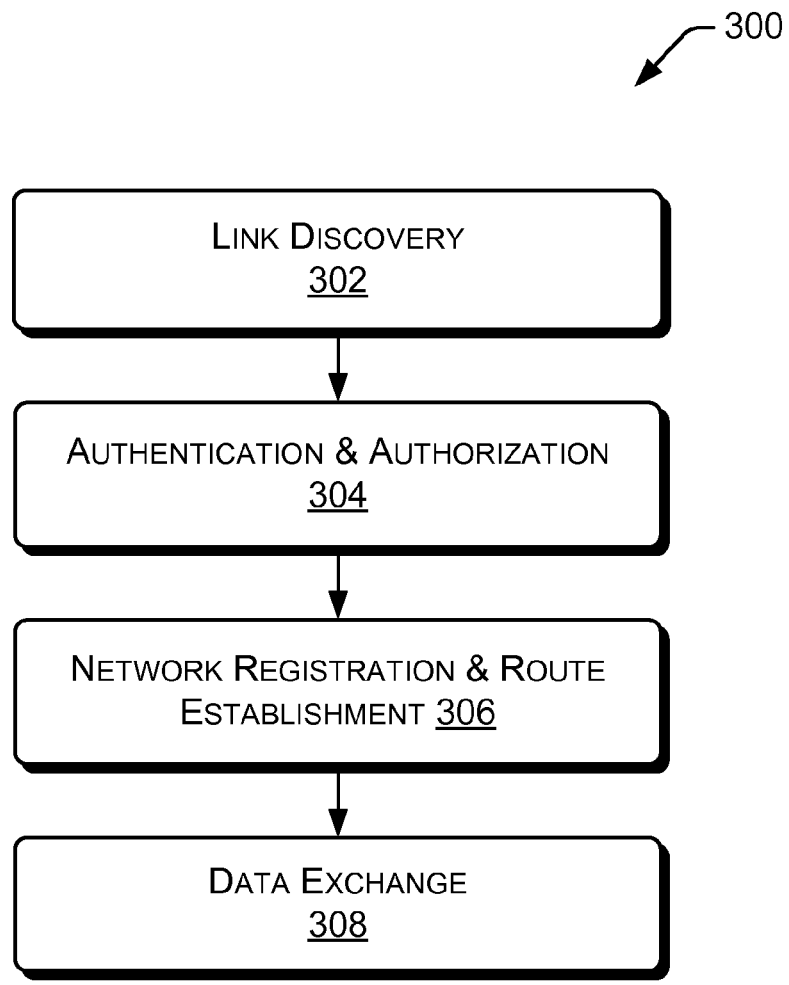
FIG. 3 is a flowchart illustrating a process by which a BPD may join a meshed area network.

FIG. 3 is a flowchart illustrating a process 300 usable by a BPD to join a meshed area network. The process includes four main phases, link discovery 302, authentication and authorization 304, network registration and route establishment 306, and data exchange 308. Link discovery 302 is the process of discovering other network computing devices that are within communication range of the BPD. Authentication and authorization 304 is the process of identifying the BPD to the network and obtaining any necessary network credentials. Network registration and route establishment 306 is the process of informing the network of the BPDs existence and place in the network. Upon successful completion of the preceding phases, a BPD will be able to exchange data, such as metering data, sensor data, or the like with a collection engine or other central office services during the data exchange phase 308.

Figure 4:
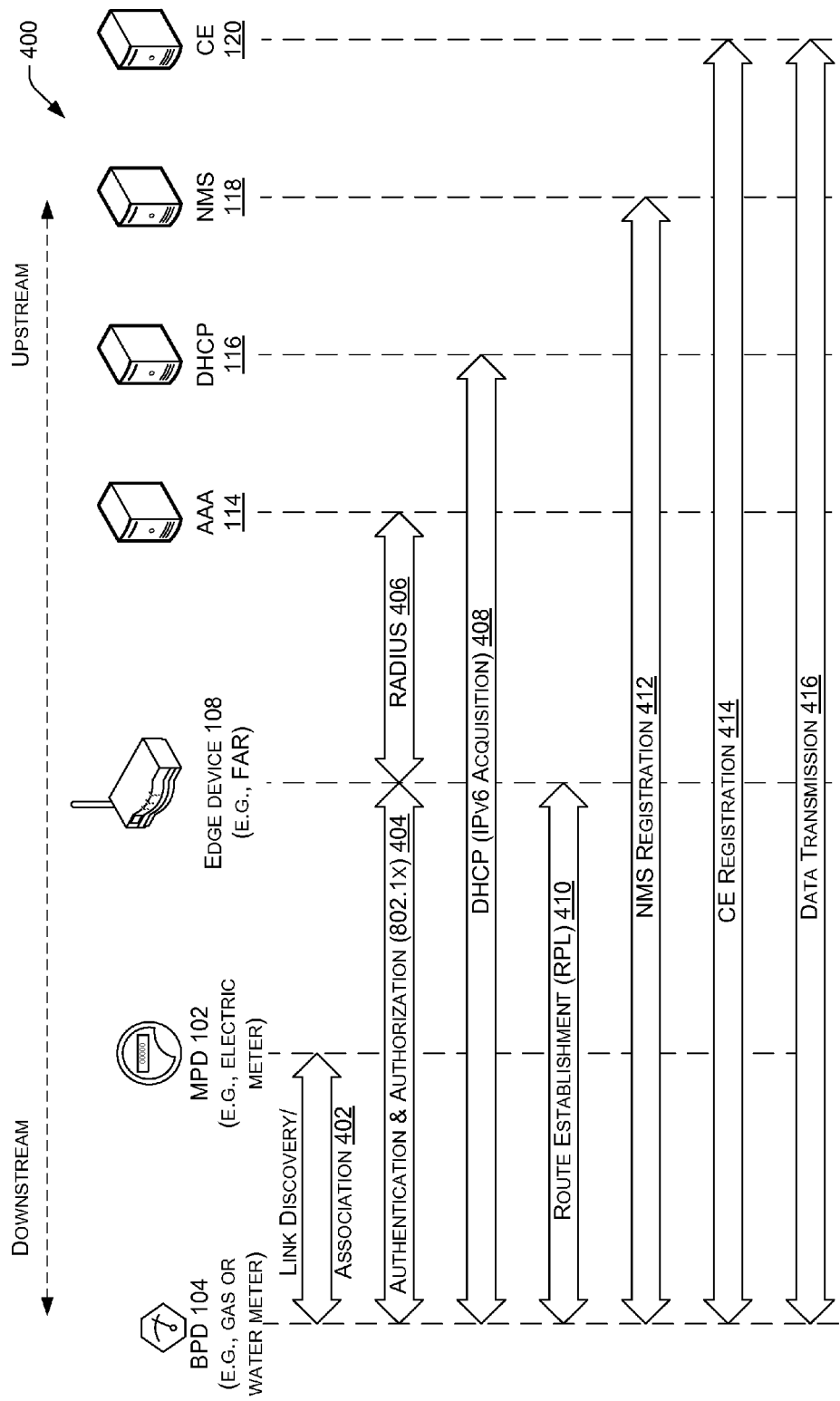
FIG. 4 is a signal flow diagram that illustrates an example of the process of FIG. 3 in the context of the architecture of FIG. 1

FIG. 4 is a signal flow diagram 400 which illustrates an example of the process 300 in the context of the architecture of FIG. 1. In FIG. 4, the double headed arrows represent one or more communications between the respective components of the architecture. For instance, arrow 402 represents a link discovery and association process that includes a series of communications between a BPD 104 and a MPD 102. The link discovery and association process is a link/physical layer process which allows the BPD 104 to discover the existence of MPD 102 or other devices. Upon learning of the existence of the MPD 102, the BPD may obtain synchronization information usable to determine current timing and control channel information for the network. The BPD 104 may then associate the MPD 102 (or another discovered device) as a parent of the BPD 104 to be a point of contact for the BPD 104 with a meshed area network.

The arrow 404 represents authentication and authorization communications between the BPD 104 and the edge device 108 (via the MPD 102). The communications may include a join request sent by the BPD 104 requesting to join the network. The edge device 108 may determine whether to grant the join request based on a variety of factors, such as the condition of the network (e.g., network traffic) or the condition of the BPD (e.g., availability of other neighboring devices with which to connect). If the edge device 108 grants the join request, the edge device 108 forwards the request to the Authentication, Authorization and Accounting (AAA) server 114.

Arrow 406 represents communications between the edge device 108 and the AAA server 114 to authenticate the identity of the BPD 104. In some examples, the edge device 108 may send an identifier and/or the authentication signature of the BPD 104 to the AAA server 114 using a networking protocol such as RADIUS (i.e., Remote Authentication Dial In User Service), for example. If the authentication is successful, the BPD 104 will obtain any necessary security keys.

Arrow 408 represents a series of communications after authentication during which the BPD 104 goes through DHCP IPv6 registration with the DHCP server 116 and obtains an internet protocol (IP) address. In some examples, to minimize the energy consumption of the BPD 104 to register with the DHCP server 116, the BPD 104 may generate an IP address from the network ID and an identifier such as the media access control (MAC) identifier of the BPD 104. In that case, the network ID will be provided to the BPD in the time of authentication (e.g., in operation 404) and operation 408 may be omitted. This allows the BPD 104 to obtain an IP address without incurring the battery cost associated with the transmissions required for the DHCP IPv6 acquisition process.

Arrow 410 represents the process by which the BPD 104 establishes its route in the area network level to the field area router (FAR) or other edge device 108. Arrow 412 represents a series of communications by which the BPD 104 may, in some examples, register with Network Management Server (NMS) 118. In this process the BPD 104 declares its activation. However, in some examples, the NMS registration operations may be skipped.

Arrow 414 represents the process by which the BPD 104 registers with the collection engine (CE) 120. This process may include correlating the BPD 104 with a specific service location (e.g., a particular address) or customer. After passing through all these phases with success, the BPD 120 is operational and is able to interact with the CE 120 to transmit its metering data and to receive commands, updates, and the like as represented by arrow 416.

Figure 5:
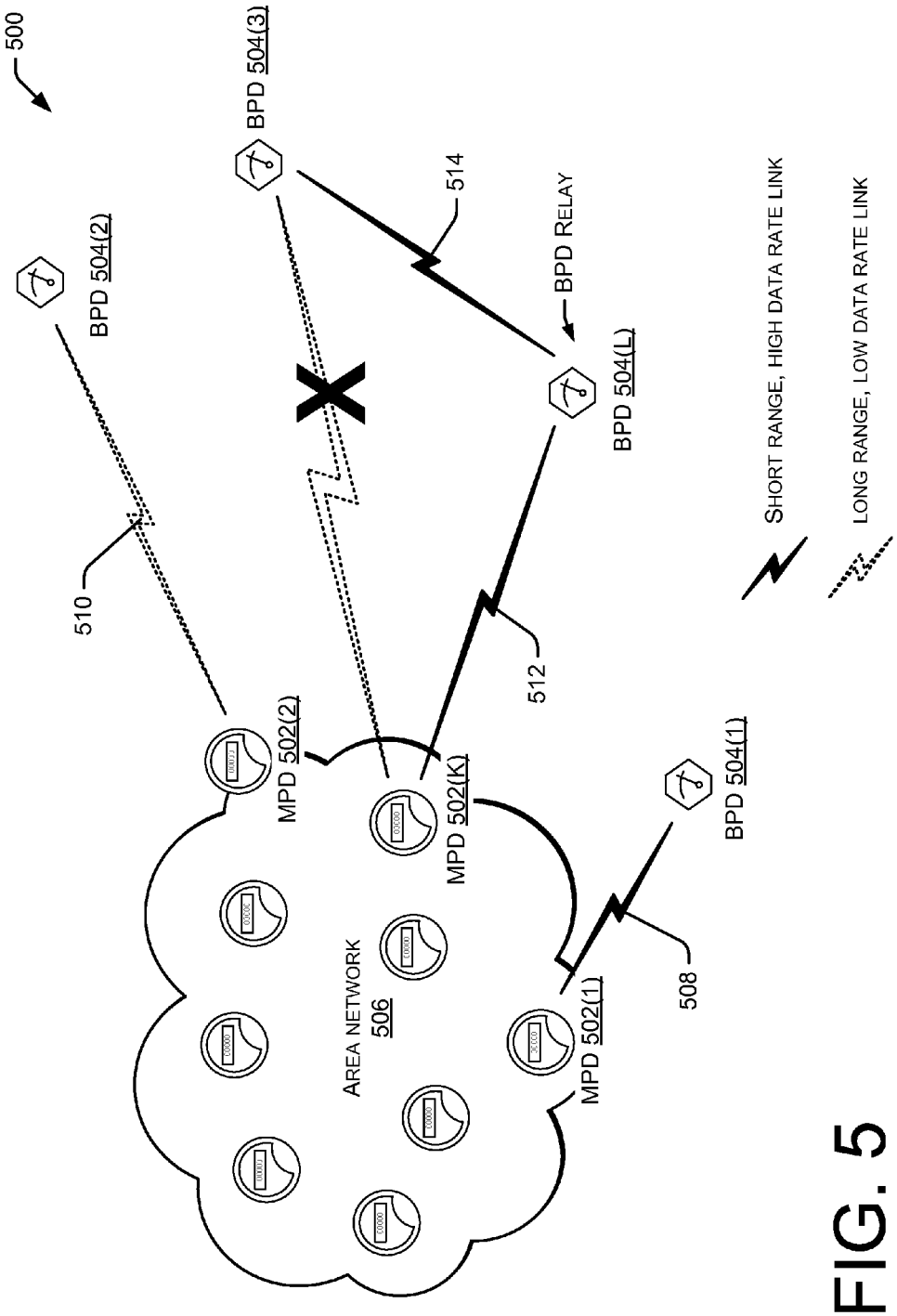
FIG. 5 is a schematic diagram of an example system illustrating example link types to be discovered.

FIG. 5 is a schematic diagram of an example system 500 illustrating additional details of an example link types that may be discovered. The link types described, and the associated link discovery techniques and topology constraints described elsewhere in this application, help to minimize energy cost for BPDs to discover other MPDs and BPDs relative to conventional processes. As shown in FIG. 5, the system 500 includes MPDs 502(1), 502(2), . . . 502(K) (collectively "MPDs 502"), and battery powered devices 504(1), 504(2), 504(3), . . . 504(L) (collectively "BPDs 504"), where K and L are any integers greater than or equal to 1 and may be the same number or different numbers. The MPDs 502 and BPDs 504 are connected to an area network 506.

As shown in FIG. 5, each BPD 504 has the possibility to connect to the area network 506 in at least two different connection modes, a default mode (or short range mode) for most transmissions, and an alternate mode (or long range mode) when connection by the default mode is unsuccessful. The solid black bolts in FIG. 5 represent short range links and the bolts with dashed outlines represent long range links. The short range mode comprises a relatively high data rate (e.g., at least about 50 kbps). The long range mode comprises a relatively lower data rate (e.g., at most about 10 kbps). Due to the much higher data rate, the short range mode is more energy efficient than the long range mode (i.e., the short range mode transmits more data per unit of energy than the long range mode, and it does so in less time). The modulations and/or output power of the short and long range modes may also be different.

By way of example and not limitation, for the short range mode the BPD 504 may employ frequency-shift keying (FSK) 802.15.4g mandatory mode (with a data rate of 50 kbps or 75 kbps, no forward error correction), FSK legacy mode (with a data rate of 150 kbps with forward error correction code rate ½), or FSK 802.15.4g option 2. In the short range mode, the output power may be about 14 dBm. For the long range mode, the BPD 504 may use, for example, offset quadrature phase-shift keying (OQPSK) modulation with direct-sequence spread spectrum (DSSS) spreading, having a much lower data rate (e.g., about 6.25 kbps). In the long range mode, the output power may be about 27 dBm. To implement these different connection modes, a media access control (MAC) sub-layer of the BDP 504 may be able to indicate to a physical layer the modulation technique and data rate to be used for each transmission. In that case, the MAC sub-layer adapts the physical modulation and/or output power to get higher reliable communication link with other MAC entities.

A BPD 504 attempting to connect to the area network 506 has the option of connecting directly to a MPD 502 using the short range mode or the long range mode. Link 508 is an example of a BPD 504(1) connected directly to an MPD 502(1) using the short range mode. Link 510 is an example in which a BPD 504(2) is connected directly to an MPD 502(2) using the long range mode. Additionally, in some instances, the BPD may also be able to connect to the area network 506 via another BPD as a BPD Relay. Links 512 and 514 are examples of a BPD 504(3) connected to another BPD 504(L) which acts as a relay to connect the BPD 504(3) to MPD 502(K).

Based on the expected delays and battery consumption estimations associated with each of these types of connections, the BPDs 504 may be configured to attempt to establish network connections according to the following order preference for the type of connectivity from high to low:

1. Connection to an MPD in short range mode.
2. Connection to a BPD-Relay short range mode.
3. Connection to an MPD in long range mode.

In some examples, a BPD may not be allowed to connect to a BPD-Relay in the long range mode due to the relatively high battery consumption burden this would place on the BPD-Relay. However, in other examples, a BPD may be allowed to connect to a BPD relay under some circumstances (e.g., a BPD relay with a higher capacity battery, limiting the number of BPDs that can use the BPD relay (e.g., to one), if the BPD would otherwise be isolated and unable to connect to any network, etc.).

These preferences for link types can be implemented by rules in the software and/or firmware of the BPD. For instance, in the example BPD of FIG. 2B, these preferences may be implemented in the communication stack 220 stored in memory of the BPD 200B. Thus, these preferences may be changed and/or updated over time by software and/or firmware updates pushed to the BPDs.

Example Discovery Process

This disclosure describes an active discovery process employed by BPDs to discover other network communication devices. Active discovery means that a BPD actively scans all channels by transmitting a discovery beacon on each channel. This discovery approach is active since it takes initiative and transmits the discovery beacon. In contrast, passive discovery is a process by which nodes simply monitor channels and wait to overhear beacons from other devices. In some examples, a passive discovery process may be used prior to or after performing the active discovery process described herein.

When a BPD initially turns on and starts looking for a network with which to connect, it begins by switching to the default, short range communication mode. If the BPD has synchronization information about one or more neighboring devices (e.g., information about the timing and/or control channel currently used by the neighboring devices to connect to a network), the BPD may enter an abbreviated or "light" discovery mode (described below). Otherwise, the BPD begins a standalone active discovery process. Duty cycle constraints on BPDs may be relaxed during the discovery process up to 25%. This higher duty cycle respects the power-supply constraints while taking into account that the discovery process tends to be a relatively short period of higher than average consumption.

Figure 6:
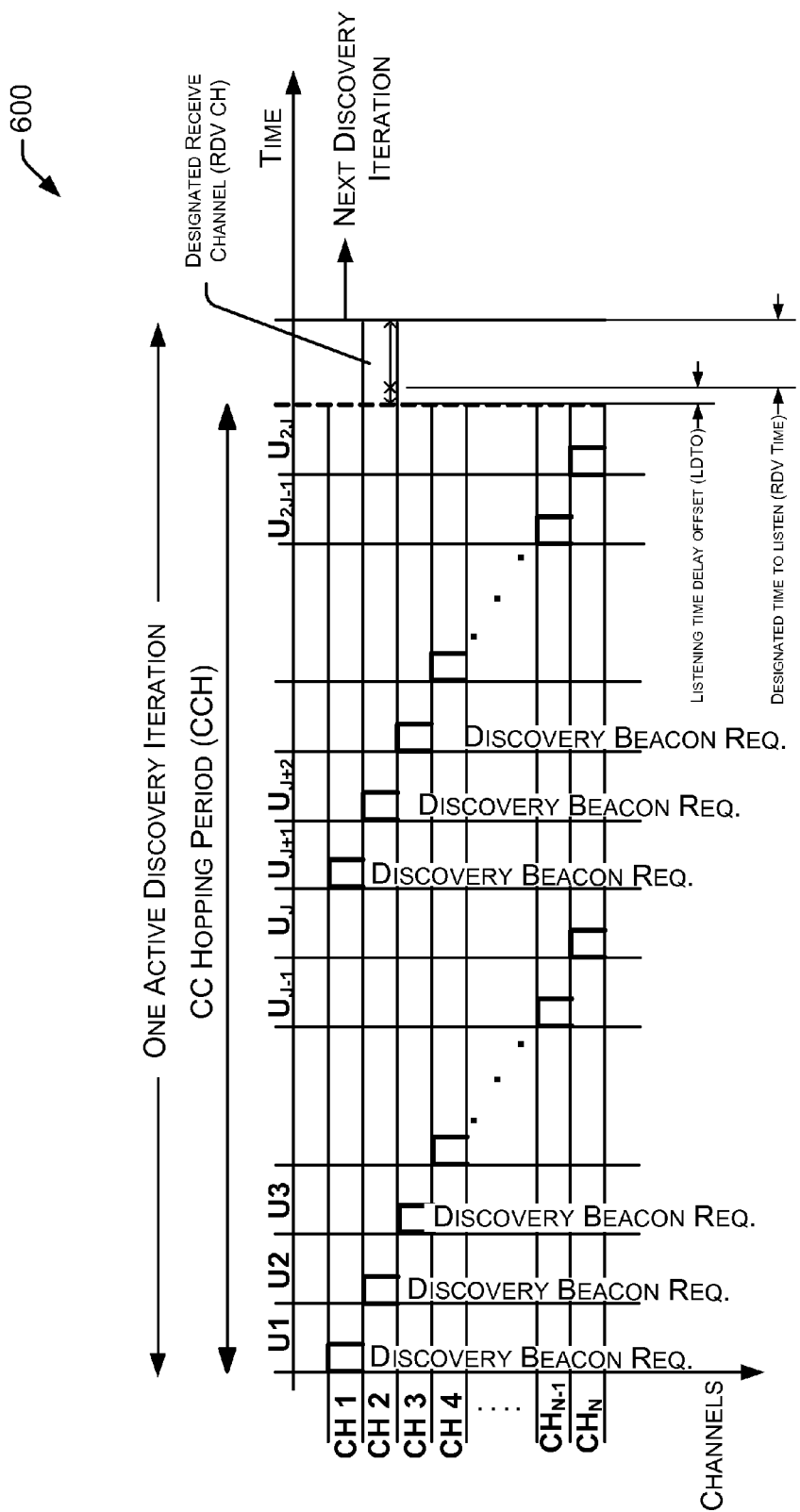
FIG. 6 is a chart illustrating an example standalone active discovery scan process usable by a BPD to discover other devices.

FIG. 6 is a chart 600 illustrating an example standalone active discovery scan process usable by a BPD to discover other devices. Initially, the BPD employs the standalone discovery process using the default, short range communication mode. In some examples, when using the short range mode, the standalone discovery mode comprises a two scans per discovery iteration (TSDI) approach, in which the BPD scans all channels twice in each control channel hopping (CCH) period before listening for a reply. A length of the CCH period may vary depending on a number of channels, duty cycle considerations of the BPDs, and other factors. In one example, the CCH period may be six seconds. Scanning every channel twice in every CCH period ensures that at least one of the discovery beacons is transmitted on the (then) control channel.

The CCH period and a channel hopping sequence may be predefined and stored in a channel plan in memory of the BPD. The CCH period is divided into uniform scan slots. A scan slot length (U) in this example is calculated by the channel hopping period divided by the number of channels (J) divided by 2 (i.e., U=CCH/J/2). The BPD selects a random channel as a start point (or this may be predefined in the channel plan) and sends a discovery beacon request on this channel on the first scan time slot (scan slot U1 in FIG. 6). Then in the next scan time slot (scan slot U2 in FIG. 6), the BPD switches to another channel (based on the predetermined channel hopping sequence stored in the channel plan) and transmits a discovery beacon request. The BPD continues this process until it scans all the channels. Then it restarts this process and scans all the channels for the second time. Only after finishing the second round of discovery beacon request transmission does the BPD switch to a receive channel specified in the discovery beacon requests to listen for a reply at a receive time also specified in the discovery beacon requests. The whole process described to this point is referred to as one active discovery iteration. Thus, the BPD performs two scans per discovery iteration in this example.

Each discovery beacon request in this example includes a designated receive channel (RDV Channel) upon which the BPD will listen for replies from any device(s) that receive the discovery beacon, and a designated receive time offset (RDV Time offset) indicated when the BPD will listen for replies. The RDV time offset inherently varies for each discovery beacon because the discovery beacons are sent sequentially over the channel hopping period. In order to minimize the number of required bits, the RDV Time Offset can be structured based on a number of remaining scan slots (RSS) which indicates the number of scan slots which are left to be scanned after this beacon discovery, a discovery beacon position offset (DBPO) which denotes the precise location of a discovery beacon in a scan slot, a listening delay time offset (LTDO) which indicates the delay between the end of the last scan slot (U2N) in the discovery iteration and the time a BPD transitions to listening mode. The MPD is able to calculate the RDV time based on the scan slot length U, the RSS, the DBPO, and the LDTO (e.g., RDV Time=(RSS*U+DBPO+LDTO). Each discovery beacon request also includes a discovery beacon identifier (DB ID) which identifies the beacon as a discovery beacon request message that needs a reply on the RDV channel and at the RDV time. In some examples, the discovery beacon may also contain a BPD MAC/Short Address.

In the case of discovery failure (not receiving any reply) the BPD may repeat this process a predetermined threshold number of iterations (e.g., three iterations).

In the case of discovery success, the BPD discovers another device (e.g., MPD or BDP) during this standalone discovery process, and the BPD connects to the discovered device. However the BPD continues a light active discovery (described below) to find more neighbors, thereby increasing its options for connecting to one or more networks. Also, while it is possible for a BPD to discover BPDs during the standalone active discovery process, it is unlikely because BPDs spend most of their time sleeping (with their transceivers powered down) and therefore are unlikely to hear the discovery beacons. Thus, it is much more likely that the devices discovered by the BPD during the standalone active discovery process are MPDs.

If after reaching the threshold number or retry iterations the BPD still has not discovered other devices, the BPD may switch to the alternative, long range communication mode to attempt to discover other MPDs. This alternative mode may be more effective than the default mode for communicating with devices that are more remote from the BPD and/or in situations of obstruction (e.g., when the BPD is located underground) or interference. In the long range mode, the BPD use either the two scan per discovery iteration (TSDI) approach or a one scan per discovery iteration (OSDI) approach, depending on the number of channels to be scanned. In the OSDI approach, each channel is scanned only once in a CCH period. For instance, if the number of channels exceeds a predetermined threshold number of channels (e.g., 32 channels), the BPD may use the OSDI approach to minimize energy consumption due to the scan and to respect a duty cycle imposed by the battery of the BPD. While (as mentioned above) discovering a BPD-Relay is preferable to discovering an MPD in long range communication mode, discovering a BPD-Relay is more complicated and costly from an energy expenditure perspective (as also mentioned above). This is why a BPD starts looking for a MPD in long range at this stage. If the BPD is unsuccessful in discovering an MPD in the long range mode, the BPD may repeat the long range mode a threshold number of retry iterations (e.g., four). If after the threshold number of retry iterations the BPD still has not discovered any other devices, the BPD may check for one or more other potential connections options (e.g., connection to a different network type such as star network, mobile connection network, or cellular connection).

If the BPD is successful in discovering an MPD in the long range mode, the BPD will receive synchronization information (e.g., a current control channel and/or a universal coordinated time used by a network to which the MPD is connected) from the MPD. The BPD may use the synchronization information obtained from the discovered MPD (in long range) to enter a light active discovery process using the short range mode to attempt to discover a BPD-Relay. This process is sometimes referred to as MPD assisted BPD Relay discovery.

The light active discovery process is an informed or "targeted" discovery process, based on synchronization information received or otherwise obtained from another source (e.g., from an MPD in the long range mode, from a previous parent or neighbor before losing connection with the parent or neighbor, from a mobile device of an administrator during installation or service—so called assisted mode—, etc.). As discussed above, synchronization information includes an indication of a current control channel and/or a universal coordinated time used by one or more devices or networks. Light active discovery comprises sending a discovery beacon request on a current control channel asking for hello beacons from any devices hearing the discovery beacon. Light active discovery can only be performed once synchronization information is known. To minimize energy consumption of the BPDs, the BPD is configured to send the discovery beacon request on the control channel during silent periods imposed to all MPD devices, thereby maximizing the chances that the discovery beacon will be heard. The discovery beacon should contain the BPD address and the sequence of next wake-up occurrences of the BPD to wait for any possible replies (i.e., Hello Beacons—HB). The HB contains information needed for the discovering BPD to select and join/associate with an area network to which the responding device is connected.

Figure 7:
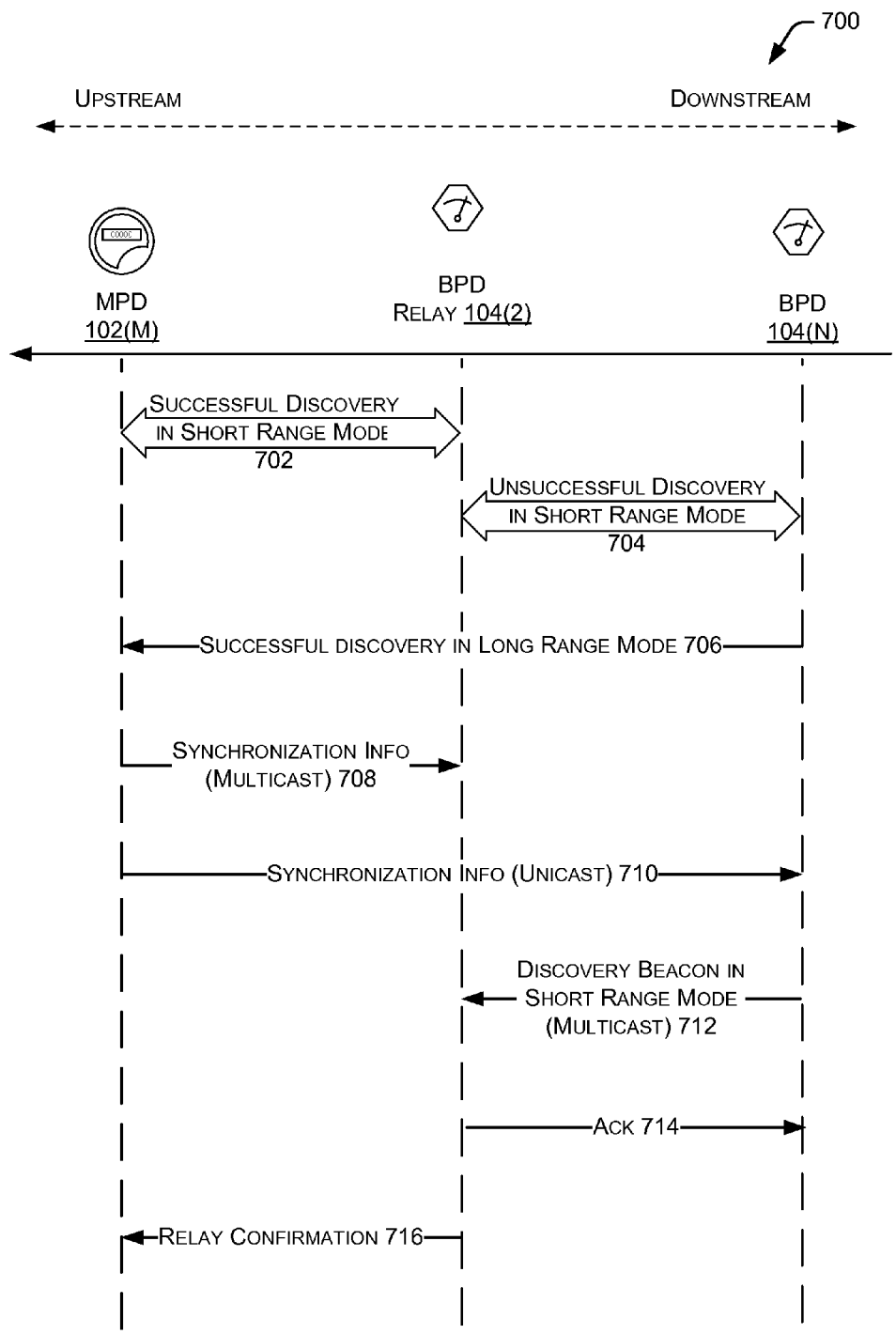
FIG. 7 is a signal flow diagram illustrating aspects of an MPD assisted BPD-Relay discovery process.

FIG. 7 is a signal flow diagram illustrating additional details of an MPD assisted BPD Relay discovery process 700, in the context of the architecture of FIG. 1. As shown in FIG. 7, BPD 104(2) has, at 702, already performed a successful standalone active discovery or a light active discovery process using the default, short range discovery mode and discovered MPD 102(M). Subsequently, at 704, another BPD 104(N) has unsuccessfully performed a standalone or light active discovery process using the default, short range discovery mode scan without discovering any other devices. This may be, for instance, because the BPD 104(2) was asleep and did not hear the discovery scan performed by BPD 104(N). Accordingly, the BPD 104(N) switches to the alternate, long range discovery mode and, at 706, successfully discovers MPD 102(M) in the long range mode. For instance, BPD 104(N) sends a discovery beacon using the long range mode. The discovery beacon is heard by MPD 102(M) and, at 708, the MPD 102(M) sends specific information in a multicast message to its BPD children using the short range communication mode to listen into the control channel in a specific time and to expect a discovery beacon from the BPD 104(N). BPD 102(2) receives this message from the MPD 102(M). At 710, the MPD 102(M) also sends a unicast message to the BPD 104(N) to ask this node to send a discovery beacon request in default short range mode on the control channel in the same time slot communicated to its other children including BPD 102(2). The BPD 104(N) receives synchronization information, from which it determines the time slot used by the devices connected to the MPD. Based on this synchronization information, at 712, the BPD 104(N) multicasts a discovery beacon request on the current control channel on the defined time slot using the default, short range mode. The discovery beacon is received by BPD 104(2) (and potentially other devices on the same network) and, at 714, BPD 104(2) sends an acknowledgment or Hello Beacon to BPD 104(N). At 716, BPD 104(2) also sends a relay confirmation to the MPD 102(M) indicating that the BPD 104(2) is acting as a BPD Relay for the BPD 104(N).

In one specific and non-limiting example, the discovery processes described above may be implemented in a network architecture having at most 64 communication channels and having a control channel hopping (CCH) period of six seconds. Additionally, in such an example, the discovery beacon size may be limited to at most 18 bytes. Also in such examples, if the number of channels to scan is less than or equal to 32, the two-scan active discovery can be applied for the long range mode. Otherwise, if the number of channels to scan is more than 32, the two-scan active discovery will be used for all modulation modes except for the long range mode (which will employ one scan per discovery iteration). Since the size of the discovery beacon is limited to 18 bytes, the duty cycle limit of the BPDs will be respected for up to 64 channels. The long range discovery scan is repeated up to four times. In a control channel hopping period, scanning each channel only once does not guarantee that at least one discovery beacon hits the control channel. With 64 channels, if each scan round is drifted properly, four iterations of scan is needed to guarantee that at least one discovery beacon hits the control channel. In order to have proper drifted scan rounds, the listening period should be "n*U+U/4"; where n is an integer number and U is the scan slot time length.

Example Authentication Process

Figure 8:
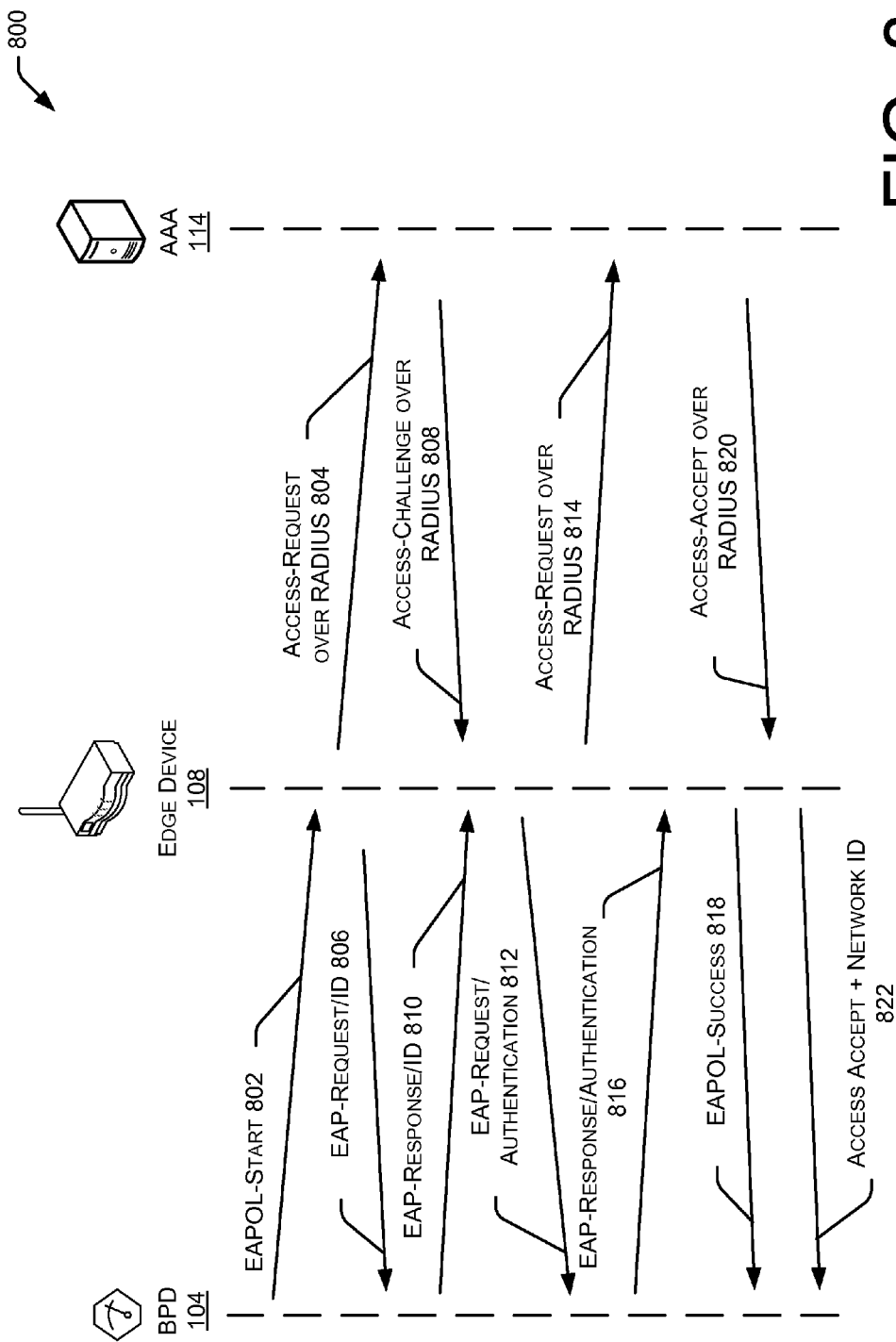
FIG. 8 is a signal flow diagram illustrating aspects of an example authentication process.

FIG. 8 is a signal flow diagram illustrating additional details of an example authentication and authorization process 800 that may, in some examples, be performed during phase 304 of the process 300. The authentication process 800 begins, at 802, by the BPD 104 sending an extensible authentication protocol (EAP) request using an authentication framework, such as EAPOL. Upon receipt, the edge device 108, at 804, sends a request to the AAA server 114 to authenticate the BPD 104. The request may be sent using a networking protocol such as remote authentication dial in user service (RADIUS), for example. The edge device 108 also, at 806, sends an EAP request for an identifier, such as a MAC ID, of the BPD. At 808, the AAA server 114 sends an access challenge to the edge device 108 again using RADIUS. At 810, the BPD 104 responds to the edge device with an EAP response including the BPD identification. At 812, the edge device 108 sends an EAP request for authentication to the BPD 104 and, at 814, sends an access request over RADIUS. At 816, the BPD 104 sends an EAP response/authentication to the edge device 108. If successful, at 818, the edge device 108 notifies the BPD 104 of EAPOL success. The BPD 104 is successfully authenticated by the AAA server 114, at 820, the AAA server 114 sends an access acceptance over RADIUS to the edge device 108. At 822, the edge device 108 sends an access accept notification to the BPD 104 that it has been successfully authenticated.

In conventional network architectures, the BPD 104 would then have to go through DHCPv6 registration to obtain an IP address. To avoid incurring the energy demands associated with the DHCPv6 process, in this example, in the last phase of the authentication process 800 the edge device 108 integrates the network ID (e.g., PAN ID, NAN ID, etc.) into the access accept message 822. The BPD 104 uses the network ID as its prefix and adds its device identifier (e.g., 64-bit MAC ID) to it to create its IP address. This approach helps the BPD 104 to avoid going through DHCPv6 process to obtain an IP address.

Example Techniques to Maintain Low Latency

This section of the disclosure describes various network architecture constraints and customizations to the communication protocol stacks of the MPDs and BPDs that may be applied to prioritize time sensitive transmissions to ensure low latency of certain transmissions, while minimizing electrical consumption of battery powered devices.

Figure 9:
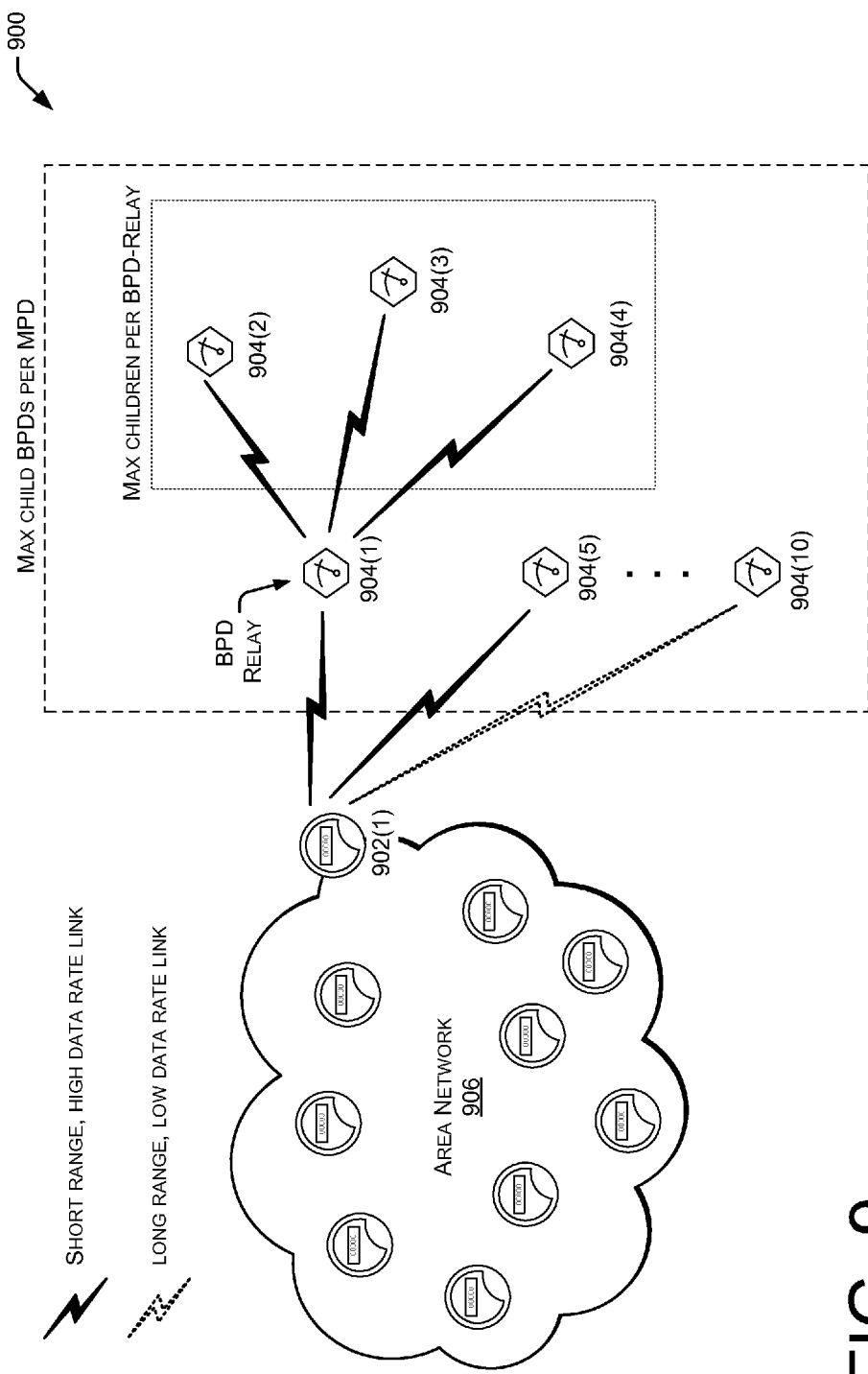
FIG. 9 is a schematic diagram illustrating an example system of MPDs and BPDs connected to an area network.

FIG. 9 is a schematic diagram illustrating an example system 900 of MPDs 902 and BPDs 904 connected to an area network 906. FIG. 9 illustrates several principles of the network topology that, when followed, help to ensure low latency of certain transmissions while minimizing electrical consumption of battery powered devices. A first example principle is that the number of BDP hops may be limited to two. That is, any transmission from a BPD device may only pass through one other BDP device before reaching a MPD. This is shown in that BDPs 904(1)-904(10) are all connected to MPD directly or through a single BPD Relay. A second example principle is that the maximum number of BPDs connected under an MPD is ten (direct and indirect). This principle is illustrated by the fact that there are only ten BPDs 904(1)-904(10) connected directly or indirectly to MPD 902(1) and ensures that an MPD is able to communicate with all of its BDP children in a timely manner without causing a bottleneck. A third example principle is that the maximum number of BPDs connected to a BPD-Relay is three. This principle is illustrated by the fact that there are only three BPDs 904(2)-904(4) connected to BPD 904(1), which is acting as a BPD Relay. In some variations on this third principle, the constraint may be relaxed to allow a BPD relay to serve as a relay for additional BPDs (e.g., limited to five BPDs per BPD relay). A fourth example principle is that BPDs may not connect to BPD relays via long range, low data rate links. This principle is illustrated in that there are no long range links between the BPD Relay 904(1) and any of its children. A fifth principle is that to be a BPD Relay, a BPD must be connected to a MPD parent by a short range, high data rate link. That is, a BPD relay cannot be connected to an MPD by a long range, low data rate link. This principle is also consistent with FIG. 9, which shows that the BPD Relay 904(1) is connected to MPD 902(1) via a high data rate link.

In addition to topology related principles, this disclosure describes various other principles that may be implemented in software, firmware, and/or communication protocols of the MPDs and/or BPDs to minimize latency of communications and minimize energy consumption by BPDs. Another example principle is that based on characteristics of their batteries, BPDs may be limited to transmitting for 120 milliseconds with a 10 second gap between two consecutive transmissions, except during discovery phase mode, when for 18 bytes of discovery beacon the duty cycle is permitted to go up to 25%. Another principle that leads to battery saving relates to the active discovery strategies of first trying to discover a short range, high data rate (e.g., 50 kbps or more) link. If no short range link is discovered, then switching to a long range, lower data rate discovery mode. And, if a long range link is discovered, leveraging the long range link to attempt to discover a short range, high data rate link to a BPD Relay.

These and other principles are described further below with reference to FIGS. 10-13 below as well as elsewhere in the disclosure. These example principles may be used separately or combination with each other to lower latency and/or minimize battery consumption of BPDs on an area network, such as a wireless meshed network. Additionally, some or all of these principles may be relaxed or eliminated entirely when BPDs have larger capacity batteries, have shorter required life spans, are rechargeable, or the like.

Figure 10:
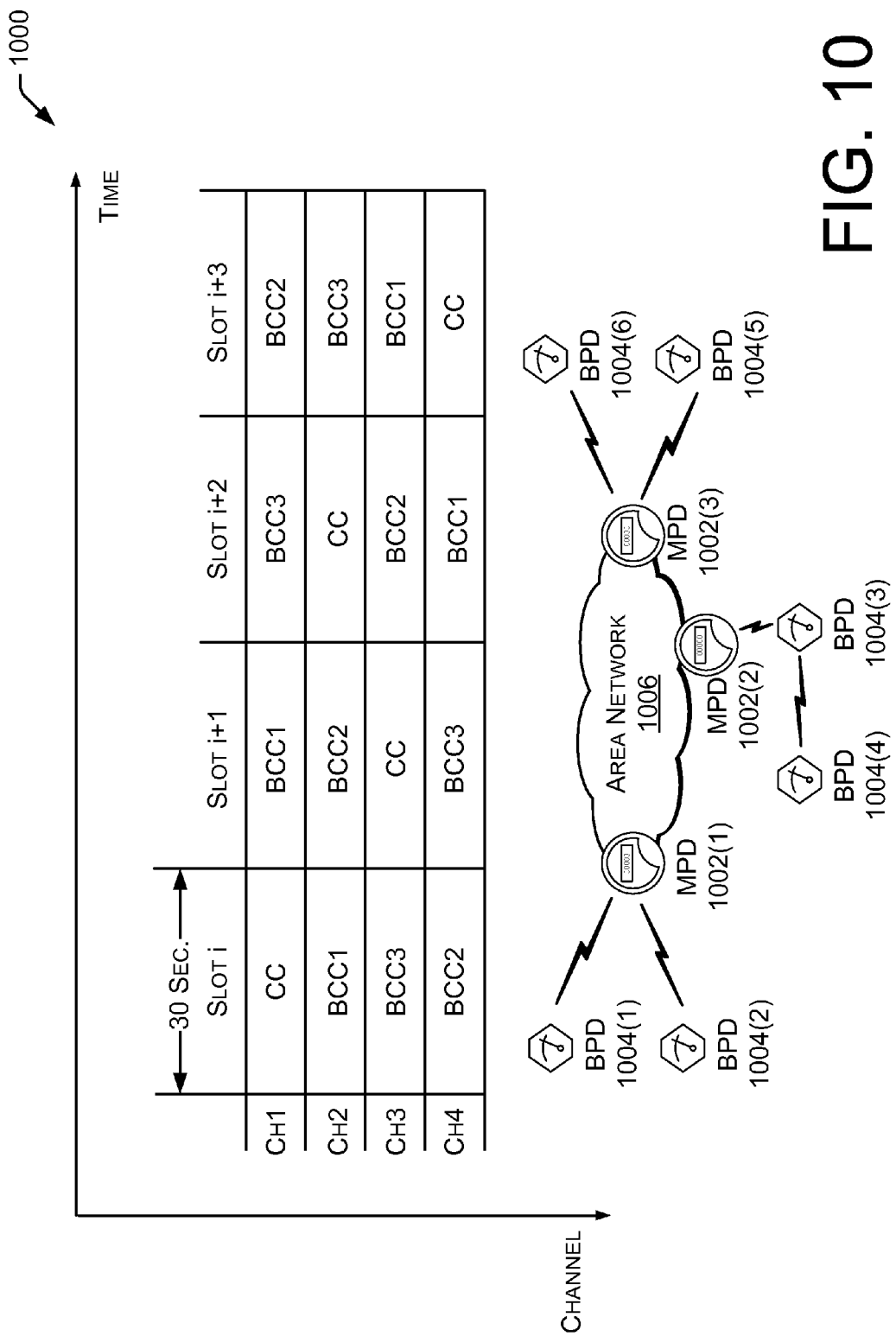
FIG. 10 is a table illustrating an example technique in which each BPD has a communication channel sequence.

FIG. 10 is a table 1000 illustrating an example technique in which each BPD has a communication channel (BCC) sequence. The BCCs are orthogonal to the control channel. In this example, the hopping period is 30 seconds. However, in other examples, longer or shorter hopping periods may be used. Each BPD uses a same BCC hopping sequence of the MPD to which it is connected. For instance, in FIG. 10, the BPDs 1004(1) and 1004(2) apply the same BCC1 sequence as their parent MPD 1002(1), BPDs 1004(3) and 1004(4) apply the same BCC2 sequence as their parent MPD 1002 (2), and BPDs 1004(5) and 1004(6) apply the same BCC3 sequence as their parent MPD 1002(3). This approach minimizes collisions, and improves the chances that BPD transmissions will be received by their parents.

Figure 11:
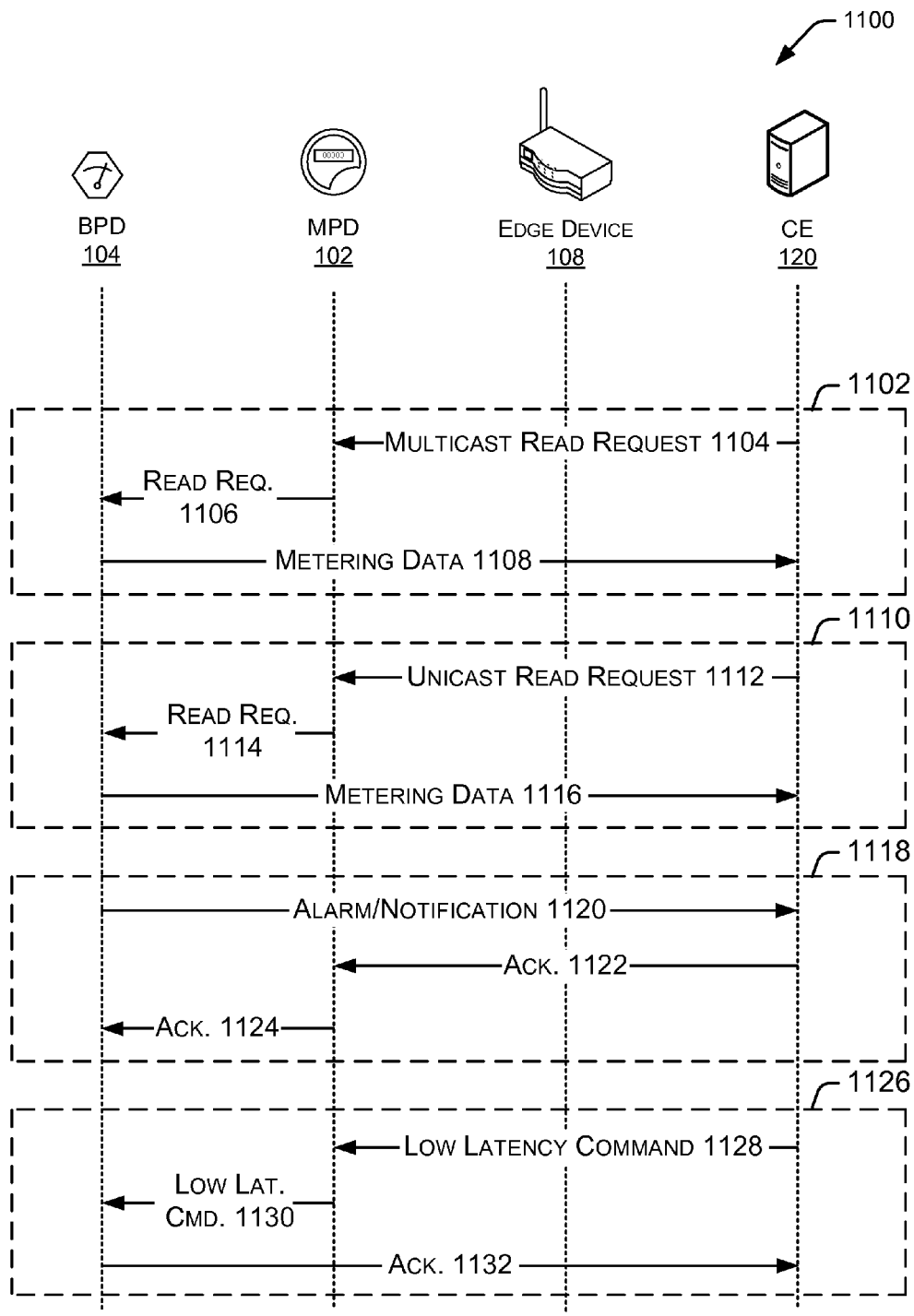
FIG. 11 is a signal flow diagram showing various types of communications between BPDs and the collection engine.

FIG. 11 illustrates a signal flow diagram 1100 showing various different types of communications between BPDs 104 and the collection engine (CE) 120. After joining a network and completing the authentication and registration phases, a BPD 104 is able to interact with collection engine (CE) 120 and potentially other central office systems 112. The different types of interaction between BPD 104 and CE 120 include both upstream communications from the BPD 104 to the CE 120 (e.g., reporting of metering data, alarming of anomalies, etc.) and downstream communications from the CE 120 to the BPD 104 (e.g., software/firmware updates, commands and controls, etc.). Different types of communications have different relative importance and priority.

Block 1102 illustrates the series of communications between the BPD 104 and the CE 120 to report metering data. Metering data is generally not time sensitive. It is usually sufficient that metering data be reported within a reasonable period (e.g., an hour, a day, etc.). Accordingly, a BPD 104 basically follows a request-response process. In a typical example, the CE 120 sends a multicast read request 1104, which is received by the MPDs 102 in an area network. The MPDs then store the read request (as described further below) until the next scheduled communication with their respective BPDs. When the BPD 104 (which as discussed above is mostly asleep) wakes up, the MPD 102 transmits a read request (unicast or multicast) 1106. The BPD 104 replies in the next wakeup window by transmitting its metering data 1108 to the MPD 102 to be forwarded immediately up to the CE 120.

Block 1110 illustrates a process in which, for any BPDs that don't respond to the initial request (i.e., any missing metering data) the CE 120 sends at 1112 down unicast read request directed to the BPD that did not respond, and asks for the missing metering data. The unicast read request is received by the MPD 102, stored until a next scheduled communication with the BPD 104, at which time the MPD 102 sends a unicast read request 1114 to the BPD 104. The BPD 104 replies in the next wakeup window by transmitting its metering data 1116 to the MPD 102 to be forwarded immediately up to the CE 120.

Block 1118 illustrates a series of communications between the BPD 104 and the CE 120 to report alarms in response to anomalies in the system, such as leaks or attempts to tamper with the BPD in the case of utility meters. Unlike metering data, alarms are time sensitive and get the highest priority of transmission in the network. These messages are referred to as low latency messages. In the case of alarms, the BPD 104 sends an alarm/notification 1120 message on the control channel substantially immediately in response to detecting the problem or emergency. These communications may be referred to as asynchronous communications since they do not wait for a next scheduled communication with the MPD. This is possible because unlike the BPDS, the MPDs are always on and listening on the control channel when they are idle. The CE 120 sends an acknowledgment 1122 that the alarm was received, which is received by the MPD 102 and stored until a next scheduled communication with the BPD 104, at which time the MPD 102 sends the acknowledgment 1124 to the BPD 104. The CE 120 may also send a command, such as a valve shut off command in response to receiving such an alarm.

Block 1126 illustrates a series of communications that may be used to transmit commands and controls (such as valve shut off) sent down by the CE 120. Commands and controls are time sensitive and are known as low-latency commands. However, because the BPDs are asleep much of the time, the BPDs are not immediately available to receive commands and controls. To ensure that commands and control messages are received by BPDs in a timely manner, every 30 seconds the BPD wakes up and listens on the control channel for a beacon preamble. The beacon preamble indicates if there is data to be transmitted to the BPD and, if so, whether it is to be unicast or multicast, and if it is to be unicast a destination address of the data. If the beacon preamble indicates that data is to be multicast or unicast to the particular BPD, the BPD wakes up and receives the data. Low latency command and control messages may be given priority over other communications by the network communication devices. This approach ensures that BPDs will receive command and control messages very quickly (within one minute of them being sent). Thus, referring back to FIG. 11, the CE 120 sends a low latency command 1128, which is received and stored at the MPD 102. Within 30 seconds the BPD 104 wakes up and listens for a beacon preamble, at which time it will be notified of the low latency command. The MPD 102 then forward low latency command 1130 to the BPD 104, which sends an acknowledgement 1132 of the low latency command. The BPD 104 then acts on whatever the command message instructs it to do (e.g., open or close a valve in the case of a water or gas meter).

Software and firmware updates, like metering data, are important, but are not time sensitive and do not need to be prioritized by the network. As a practical matter, software and firmware updates and any other downstream traffic follows the same process as described for the commands and controls. However, command and control messages are prioritized over software/firmware updates, such that if a command or control message is sent while a large software/firmware update is waiting to be transmitted, the command or control message will be transmitted ahead of the software/firmware update.

Example Store/Forward Techniques

As discussed above, transmissions sent to a BPD and/or transmissions sent by a BPD relay may not necessarily be transmitted immediately. Instead, these transmissions may need to be stored temporarily prior to forwarding them to their destinations. This section describes additional details of store and forward techniques applied by MPD devices when forwarding communications downstream to BPDs as well as techniques used by BPD relays when forwarding communications upstream and downstream.

Figure 12:
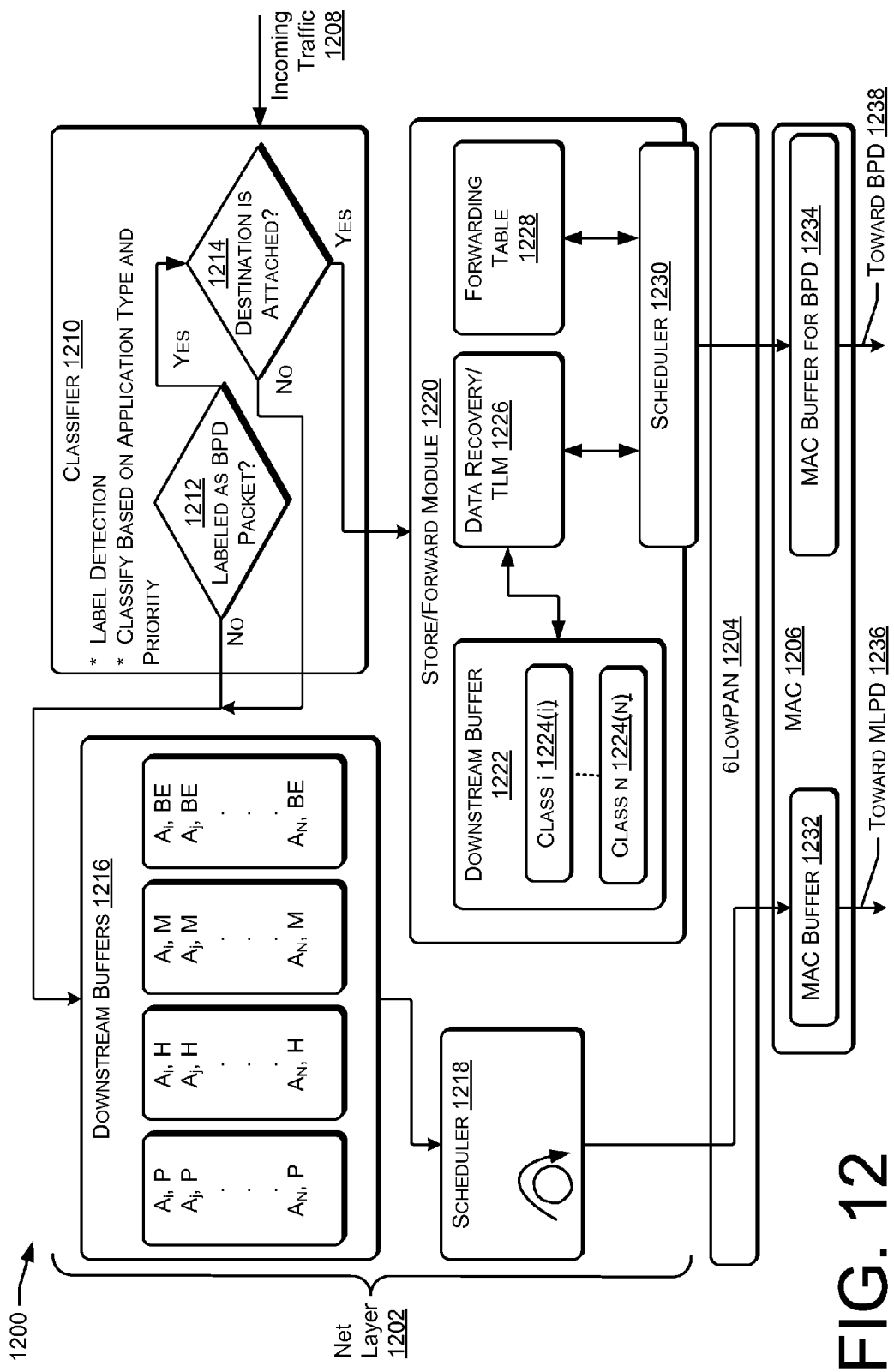
FIG. 12 is a schematic diagram of a MPD and a flow of operations performed by the MPD related to storing and forwarding transmissions.

FIG. 12 is a schematic diagram of a MPD 1200 and a flow of operations performed by the MPD 1200 related to storing and forwarding transmissions. The store and forward process for MPD devices only applies to downstream communications to BPDs. There is no need for MPDs to store upstream transmissions prior to forwarding them, since all upstream devices are MPDs that are always on and able to receive transmissions immediately.

Aspects of the store and forward functionality of the MPD 1200 are implemented in a NET layer 1202, a 6LowPAN layer 1204, and a MAC layer 1206. Incoming traffic 1208 enters the MPD at a classifier 1210 in the NET layer 1202. At block 1212, the classifier 1210 determines if the incoming packet is destined for BPD. This determination whether a packet is destined for BPD may be made based on a label applied to the packet by the sending device (e.g., collection engine or other central office service) or an intermediate device (e.g., edge device). At block 1214 the classifier 1210 determines whether the intended destination is a child attached to the MPD. This determination may be made with reference to a neighbor list or child list maintained in memory of the MPD. If the answer to either question is no (i.e., the packet is destined for an MPD, or the destination is not attached to the MPD) the packet is sent to an appropriate one of multiple downstream buffers 1216. A scheduler 1218 then forwards the packets to the appropriate destination.

If the classifier 1210 determines that the answer to both questions is yes (i.e., the packet is destined to a BPD, and the BPD is attached to the MPD), the packet is passed to the store/forward module 1220. If the packet is to be unicast to a single BPD, then the packet is stored in a downstream buffer 1222 based on its class (e.g., class 1224$i$-1224$x$, where x is an integer number of distinct classes of communication types) until it is time to be transmitted to the BDP. The classes 1224$i$-1224$x$ correspond to different classes of transmissions, such as low latency commands, read requests, software updates, or the like. A data recovery/TLM module 1226 handles packet transmission failures. If a packet is not sent for some reason, the data recovery/TLM module checks if the transmission timed out. If not, it will resend the packet to the corresponding buffer to try transmission again. A forwarding table 1228 contains address information (e.g., unicast or multicast addresses) indicating where the packet is destined. A scheduler 1230 determines, based on the relative priorities of the classes of buffers, an order in which to send the packets. When the scheduler 1230 designates a packet to send it is passed to the MAC layer for transmission. Outgoing transmissions from the schedulers 1218 and 1230 are placed in MAC buffers 1232 and 1234 for transmission toward an MPD 1236 and toward a BPD 1238, respectively.

If the packet is to be multicast, the process depends on whether all the devices in the multicast group are BPDs, or if the multicast group includes both BPDs and MPDs. If the multicast address is dedicated to an IP multicast group of only BPDs, the process is almost the same as unicast traffic. The MPDs which have associated BPDs of this multicast group will send such a packet to their store/forward module 1120 and transfer it to the BPDs. The NET layer 1202 can use the MAC layer 1206 multicast service to ask only the concerned BPDs to stay awake and receive such a packet without sending the packet to all the BPDs associated with the respective MPD.

If the multicast address is dedicated to a group of MPDs and BPDs, an application level proxy may be used. In that case, the application level proxy (not shown) in each MPD detects that this packet is destined to at least one BPD and sends it to the store/forward module 1220 to be transmitted to the concerned BPDs associated to this MPD. The NET layer 1202 can use the MAC layer 1206 multicast service to ask only the concerned BPDs to stay awake and receive such a packet and not sending data to all the associated BPDs.

Figure 13:
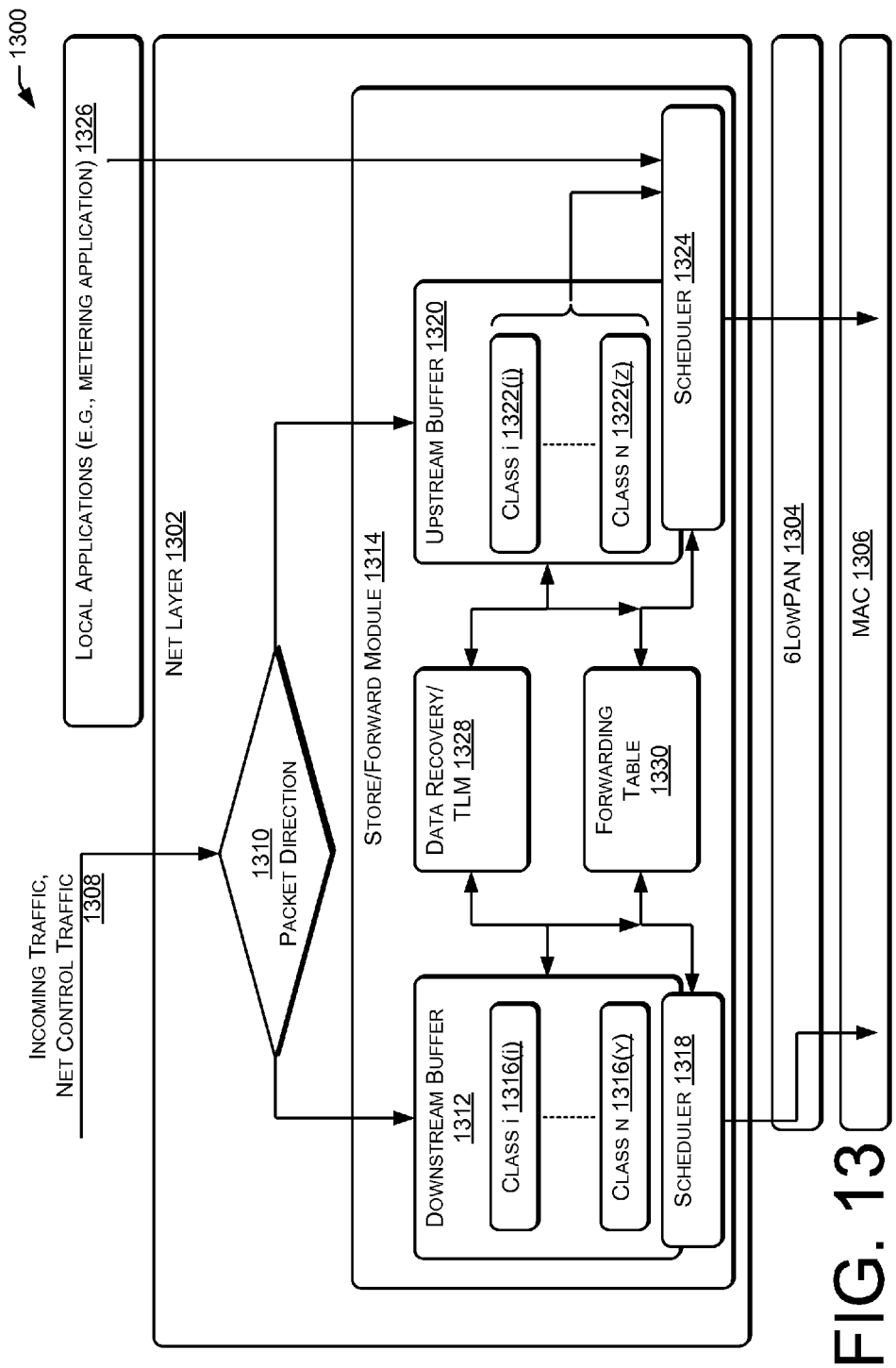
FIG. 13 is a schematic diagram of a BPD and a flow of operations performed by the BPD related to storing and forwarding transmissions.

FIG. 13 is a schematic diagram of a BPD Relay 1300 and a flow of operations performed by the BPD Relay 1300 related to storing and forwarding transmissions. Similar to the MPD example, aspects of the store and forward functionality of the BPD Relay 1300 are implemented in a NET layer 1302, a 6LowPAN layer 1304, and a MAC layer 1306. Incoming traffic and network control traffic 1308 is received at the NET layer 1302 and, at block 1310, the BPD Relay 1300 determines whether the traffic is headed upstream or downstream. If the packet is headed downstream, it is routed to a downstream buffer 1312 of the store/forward module 1314, where it is sorted by class (classes 1316$i$-1316$y$ where y is any integer representing the number of distinct classes).

The packets will be stored and wait for the synchronous RDV time that is set between BPD-Relay and its BPD children, at which time it will be passed on to the MAC layer 1306 in priority order by the scheduler 1318. For downstream transmissions, the functionality of the store/forward module in the BPD Relay is substantially the same as for an MPD.

If at block 1310 the packet is headed upstream, the packet is passed to an upstream buffer 1320 of the store/forward module 1314, where it is stored based on class (e.g., class 1322i-1322z, where z is any integer representing the number of distinct classes). A received upstream packet cannot be transmitted upon its reception. A scheduler 1324 determines when to transmit the stored packets based on the timing imposed by duty cycle limit of the BPD Relay 1300. Additionally, the scheduler 1324 of the store/forward module 1314 multiplexes the forwarded packets with local packets generated by one or more local applications 1326 of the BPD Relay (e.g., a metering or metrology application in the case of a utility meter). A data recovery/TLM module 1328 and a forwarding table 1330 perform functions similar to those described for the MPD store/forward module and will therefore not be described in detail here. Outgoing transmissions from the schedulers 1318 and 1324 are passed to the MAC layer 1306 for transmission toward downstream and upstream devices, respectively.

Example BPD Migration Techniques

Figure 14:
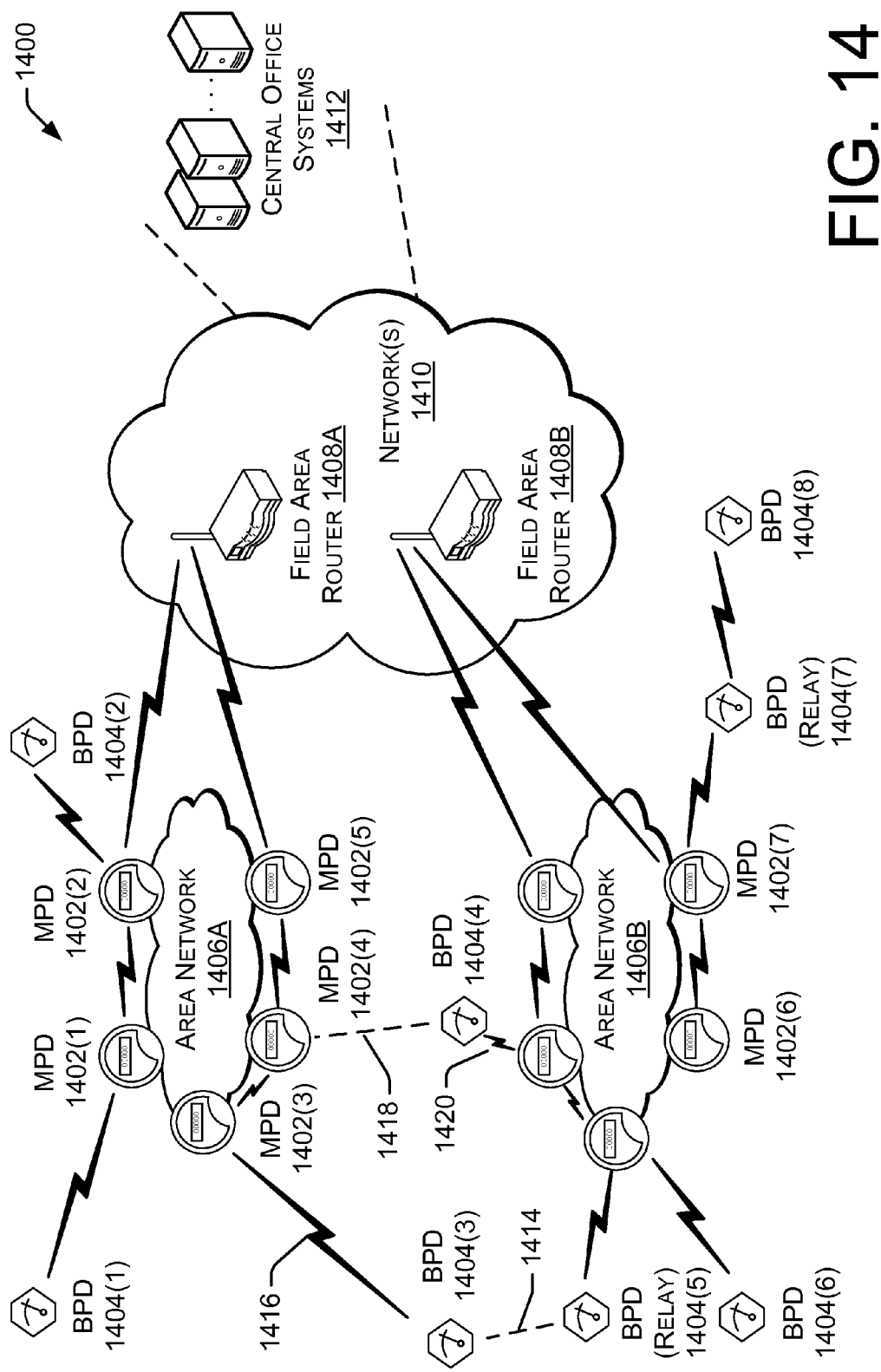
FIG. 14 is a schematic diagram showing a network and examples of two BPDs that have migrated from one area network (AN) to another AN.

FIG. 14 shows a network 1400 and examples of two battery powered devices (BPDs) that have migrated from one area network (AN) to another AN. In one example, node migration involves disassociation of a BPD from its current parent node and association with a node that is in an AN different from the current AN. For node migration a BPD may decide independently from its parent whether to migrate. Also, if a parent migrates, the BPD will not necessarily migrate with the parent. However, since node migration of a BPD may utilize a NET registration process, the rules defined for BPD migration may be more severe than those used for MPD nodes. In some examples, BPD may migrate to a new AN if the BPD loses its connection to its current favorite parent and that parent is the only parent in the BPD's parent list and no other node (with the same or higher level of capability) can be found as a parent in the same AN. If a BPD has multiple parents of the same AN in its parent list, in some examples even if the favorite parent leaves it must select another parent among the remaining parents in its list and is not allowed to migrate.

Example reasons that may cause a BPD to migrate are listed below:
  BPD has only one MPD parent in its parent list and the connection with this parent is lost. The BPD does not find another MPD in the same PAN but does find one in another AN.
  BPD receives a disassociation command from its MPD parent. The BPD does not find another MPD in the same AN but does find one in another AN.
  BPD has a BPD-Relay as the parent and discovers a MPD that can be its parent in another AN and to which the BPD can connect via a short range link.
  BPD has a BPD-Relay as its parent and either the connection is lost or the BPD receives a disassociation message. If the BPD does not discover a MPD or a BPD-Relay in the same AN, but does discover a BPD-Relay in another AN, the BPD may be configured to migrate.

A BPD that is synchronized and has discovered a first parent may continue its light discovery process with a frequency adapted to its energy constraints. That is, though the light discovery process, the BPD may discover other MPDs in other ANs. The BPD may keep them in its neighbor list and use their information if it becomes desirable to migrate. Thus, instead of attempting to find a node in another AN, a BPD that has lost its connection in its current AN may refer to its neighbor table and see if there are another MPDs in other ANs in its vicinity. If so, the BPD may connect to that MPD without performing an extra discovery process.

In the network 1400, the central office systems 1412 are in communication with one or more networks 1410, which may be the Internet or other network(s) of public or private configuration and/or ownership. Two field area routers or other edge devices 1408A, 1408B communicate with the networks 1410. Additionally, edge devices 1408A, 1408B are in communication with area networks 1406A, 1406B, respectively. Area networks 1406A and 1406B each include a number of mains powered devices (MPDs), which for purposes of illustration include MPD 1402(1) through 1402 (7). The MPDs may be electric meters or other network components that have access to electrical power (mains) and are therefore able to operate on a much greater duty cycle than battery powered devices. Some of the MPDs are in communications with one or more battery powered devices (BPDs), which for purposes of illustration include BPDs 1404(1) through 1404(8). The BPDs may be configured to operate with, or include, (natural) gas meters, water meters or other devices that do not have electrical power and therefore require batteries.

Some of the BPDs utilize MPDs as relays to communicate through the area networks 1406 and to communicate with the edge devices 1408. In one example, BPD 1404(1) utilizes MPD 1402(1) and MPD 1402(2) as relays to communicate through the area network 1406A to field area router 1408A and central office systems 1412. Additionally, some of the BPDs utilize other BPDs as relays to communicate with a MPD. For example, BPD 1404(8) uses BPD 1404(7) as a relay to reach MPD 1402(7), and to thereby reach edge device 1408B and central office system 1412.

In some instances, it is beneficial for a network node to migrate from one area network to another area network. For example, BPD 1404(3) initially utilized BPD 1404(5) at link 1414 as a relay to reach area network 1406B. However, the link 1414 may be lost, or BPD 1404(3) may receive a command to disassociate with relay BPD 1404(5). Accordingly, BPD 1404(3) was initially part of AN 1406B. However, in a discovery process, BPD 1404(3) discovered MPD 1402(3), and is able to communicate through link 1416 with area network 1406A. By migrating from AN 1406B to AN 1406A, BPD 1404(3) is able to reduce the relay burden on BPD 1404(5).

In a second example of a node migrating from one area network to another area network, BPD 1404(4) originally communicated over link 1418 with MPD 1402(4) and was therefore part of area network 1406A. However, link 1418 may be lost (e.g., because a parent failed, radio interference, etc.). In a discovery process, BPD 1404(4) discovered an MPD in area network 1406B. Because the link 1420 is shorter than link 1418, BPD 1404(4) is better able to communicate with area network 1406B. Accordingly, the migration of BPD 1404(4) was an improvement.

Example Methods of Operation

Figure 15:
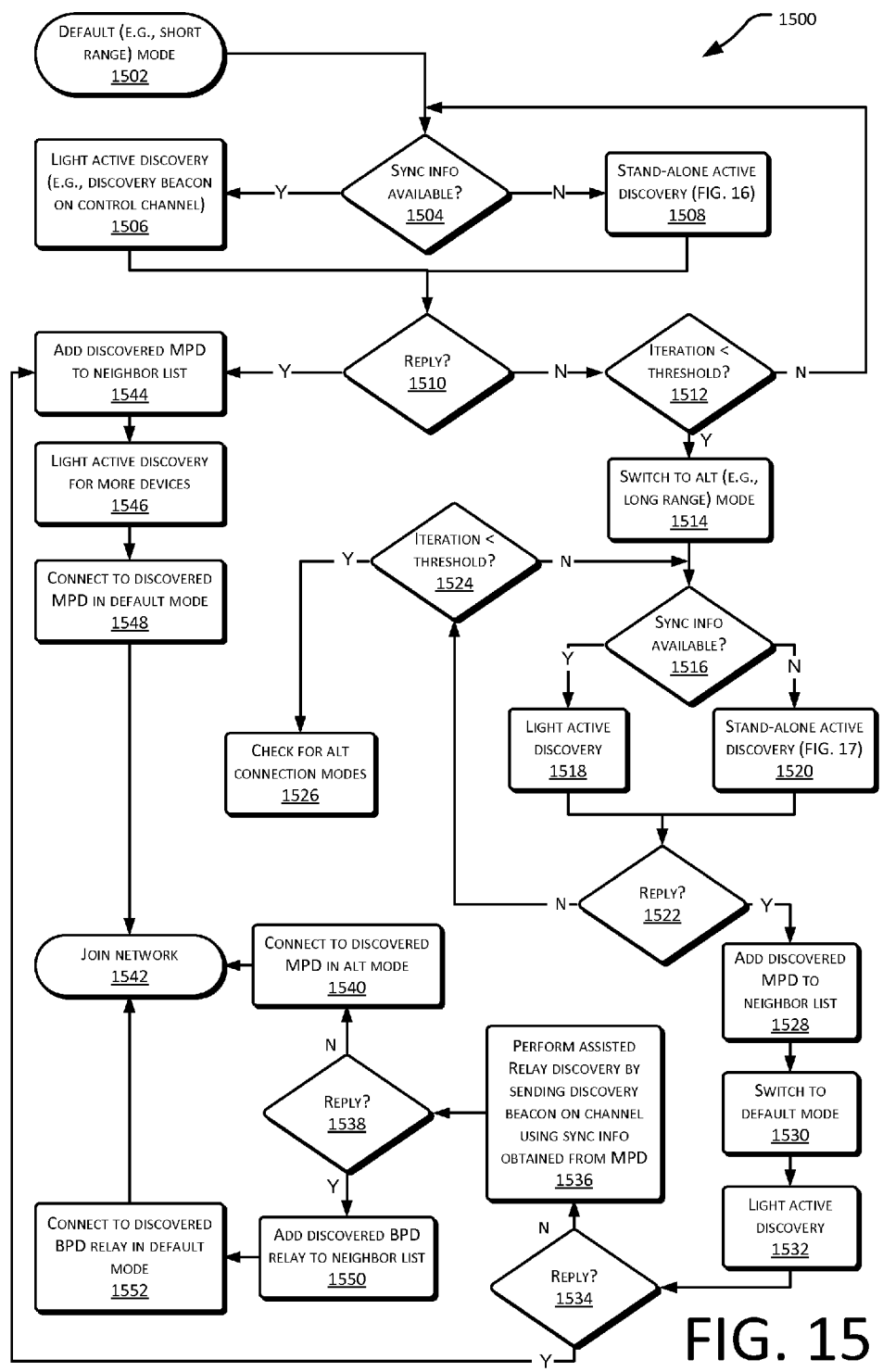
FIG. 15 is a flowchart showing example aspects of discovery processes, whereby network devices may join area network (AN).

FIG. 15 is a flowchart which illustrates an example flow of operations 1500. The example flow of operations 1500 is described in the context of the example of architecture 100 and with reference to the devices illustrated in FIG. 1. However, the flow of operations 1500 is not limited to use with the architecture 100 and devices of FIG. 1 and may be implemented using other architectures and devices.

FIG. 15 shows example aspects of discovery process(es), whereby network devices may join an area network (AN). In FIG. 15, the discovery process is discussed with respect to a BPD; however, other devices could utilize similar discovery processes.

At block 1502, the BPD (or other device) may switch to a default discovery mode. In the example shown, the default mode may include short range transmissions, such as those described at blocks 1602 through 1612 in FIG. 16.

At block 1504, the BPD determines if synchronization information is available. The synchronization information may have been obtained from an install technician, a handheld device utilized by the technician, a prior connection to a network, long-range communication with a MPD, or other means. The sync info may include timing and/or channel information that will allow the BPD to establish communication with other network devices, such as other BPDs. The timing information may include or be associated with a hopping sequence of channels used by the network. If the BPD already has the hopping sequence information, the sync info may provide information regarding a coordinated time used by the network and/or on how that hopping sequence information can be used to communicate with nearby network devices.

At block 1506, if the sync info is available, the BPD may enter a light active discovery mode (e.g., the transmission of a discovery beacon on a control channel). The discovery beacon assists the BPD to find other nodes within the AN. At block 1508, if the sync info is not available, the BPD may enter a stand-alone active discovery mode (e.g., as described in FIG. 16). The stand-alone discovery mode may include short-range discovery techniques, such as discovery beacons on multiple channels.

At block 1510, the BPD determines if network device(s) have replied to the light active discovery of block 1506 or the stand-alone discovery of block 1508. The reply may come from a MPD. MPDs tend to be powered-up and actively receiving transmissions, while BPDs are typically in a sleep mode, and will be unlikely to respond to the discovery of blocks 1506 and/or 1508.

At block 1512, if there was no reply to the requests discovery (by either of blocks 1506 or 1508) then this process is repeated, if the number of iterations is less than a threshold. The threshold prevents the BPD from being caught in an endless loop, if no response is obtained.

At block 1514, when the threshold is exceeded, the BPD switches to an alternative mode, such as long range mode. This transition also seen at block 1614 of FIG. 16.

At block 1516, a determination is made if synchronization information is available. Such sync info would provide information on MPDs in the area of the BPD, and may include information on timing and/or channels of use, etc. At block 1518, if such sync info is available, light active discovery is performed by the BPD, in an attempt to locate a MPD in the area. At block 1520, if such sync info is not available, stand-alone active discovery is performed (e.g., as described in FIG. 17). The discovery may be performed in a long-range mode, and attempts to communicate with MPDs within range of the BPD.

At block 1522, the BPD determines is a reply was received to the light active discovery of block 1518 or the stand-alone active discovery of block 1520. If not, at block 1524, the BPD determines if a threshold number of attempts has been made. When the threshold is reached, at block 1526, alternative means of connecting the BPD to the network are investigated. Such alternative means are typically unlikely, and may involve accessing power line communications (PLC), accessing a star-configuration network, accessing a cellular network, etc.

At block 1528, if a reply was received from the light active discovery 1518 or the stand-alone active discovery 1520, then the MPD that replied is added to a neighbor list at block 1528. In the example of FIG. 2B, the neighbor list 224 may be used.

At block 1530, the BPD switches to default mode, and at block 1532 the BPD performs light active discovery, thereby searching for other BPD in a short-range mode. The light active discovery may be performed using information obtained from the MPD added to the neighbor list at block 1528. Such information may assist the BPD to communicate with other BPDs at the times that they are actively communicating and not in sleep mode.

At block 1534, the BPD determines if a reply was received to the light active discovery of block 1532. At block 1536, if there was no reply, an assisted discovery of a relay node is performed by sending a discovery beacon on channel using sync info obtained from MPD. A relay node would assist the BPD to connect to the MPD found at blocks 1522 and 1528.

At block 1538, the BPD determines if a reply was received to the discovery beacon sent at block 1536. If no reply was received, at block 1540 the BPD may connect to the discovered MPD in an alternative mode, due to the lack of a relay device. That is, since there was no reply from a relay device at block 1538, the BPD will have to connect to the MPD in a means that is an alternative to use of a relay device. (The discovered MPD was discovered at block 1522, when a reply from the MPD was received.) At block 1542, the BPD has joined the network.

At block 1538, if a reply was received from a BPD relay, then at block 1550 the discovered BPD relay is added to the neighbor list. At block 1552, the BPD connects to the discovered BPD relay in the default mode. Using the relay BPD, the BPD is able to join the network at block 1542.

At block 1534, if no reply to the light active discovery of block 1532 was received, then at block 1544 the discovered MPD is added to the neighbor list (e.g., neighbor list 224 of FIG. 2A). At block 1546, the BPD performs light active discovery, in an attempt to discover more network devices in its vicinity. At block 1548, the BPD connects to the discovered MPD in a default mode. At block 1542, the BPD joins the network.

Figure 16:
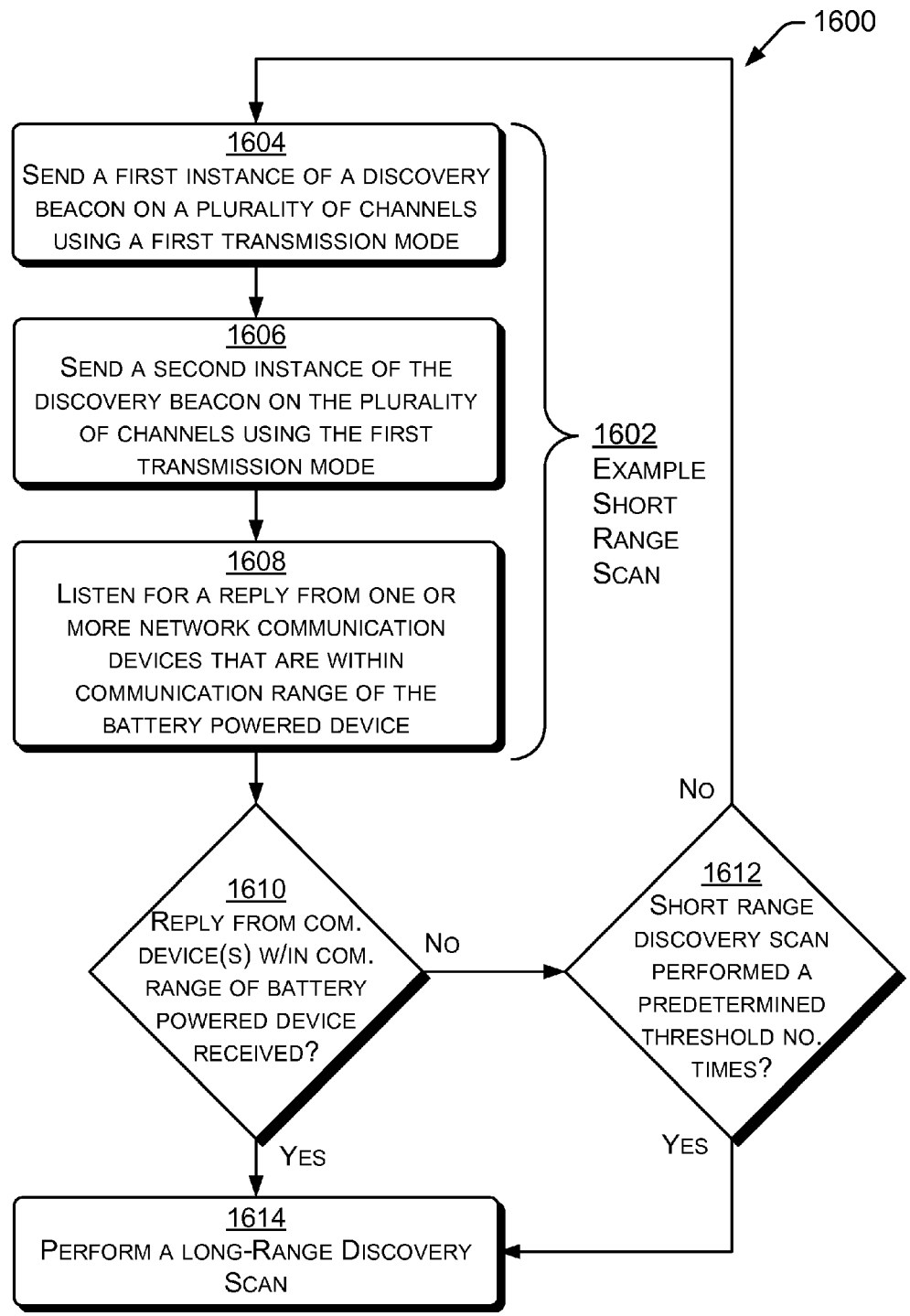
FIG. 16 is a flowchart showing example aspects of a short range scan within a network.

FIG. 16 shows example aspects of operation of a network node, which may be a battery powered device (e.g., battery powered device 200B of FIG. 2B). The example aspects may include techniques 1600 to utilize short- and long-range scans in a discovery mode. In one example, the discovery mode provides opportunities for the battery powered device to migrate from one parent to another parent and/or from one area network (AN) to another AN.

Block-group 1602 show example operation of a short-range discovery scan, in which a battery powered device scans its neighbors for potential parent nodes and for opportunities to transfer to a different parent and/or to a different AN. In some examples, a short-range scan may have a higher data rate than a long-range scan, but the transmission distance is more limited.

At block 1604, a battery powered device may send a first instance of a discovery beacon, as the battery powered device attempts to discover other network elements. The discovery beacon may be sent on a plurality of channels using a first transmission mode. At block 1606, the battery powered device may send a second instance of the discovery beacon on the plurality of channels using the first transmission mode. In the example battery powered device (PBD) of FIG. 2B, the first and second transmissions may be sent by the transceiver 204 and managed by the processing unit 202.

At block 1608, after sending the first and second instances of the discovery beacon on the plurality of channels using the first transmission mode, the battery powered device may listen for a reply from one or more network communication devices that are within communication range of the first transmission mode.

At block 1610, the battery powered device determines if it has received a reply from one or more network communication devices that are within communication range of the battery powered device. If a reply was not received, at block 1612 the battery powered device determines if the short range discovery scan (e.g., blocks 1604-1608) has been performed a predetermined threshold number of times. In one example, the threshold number of times may be three times, although this number may vary, depending on the characteristics of the network and the battery powered device.

If at block 1612 the short range scan has been performed the threshold number of times, or at block 1610 if the battery powered device has received a reply from a communications device within communications range of the battery powered device, then at block 1614 the battery powered device performs a long range discovery scan.

Figure 17:
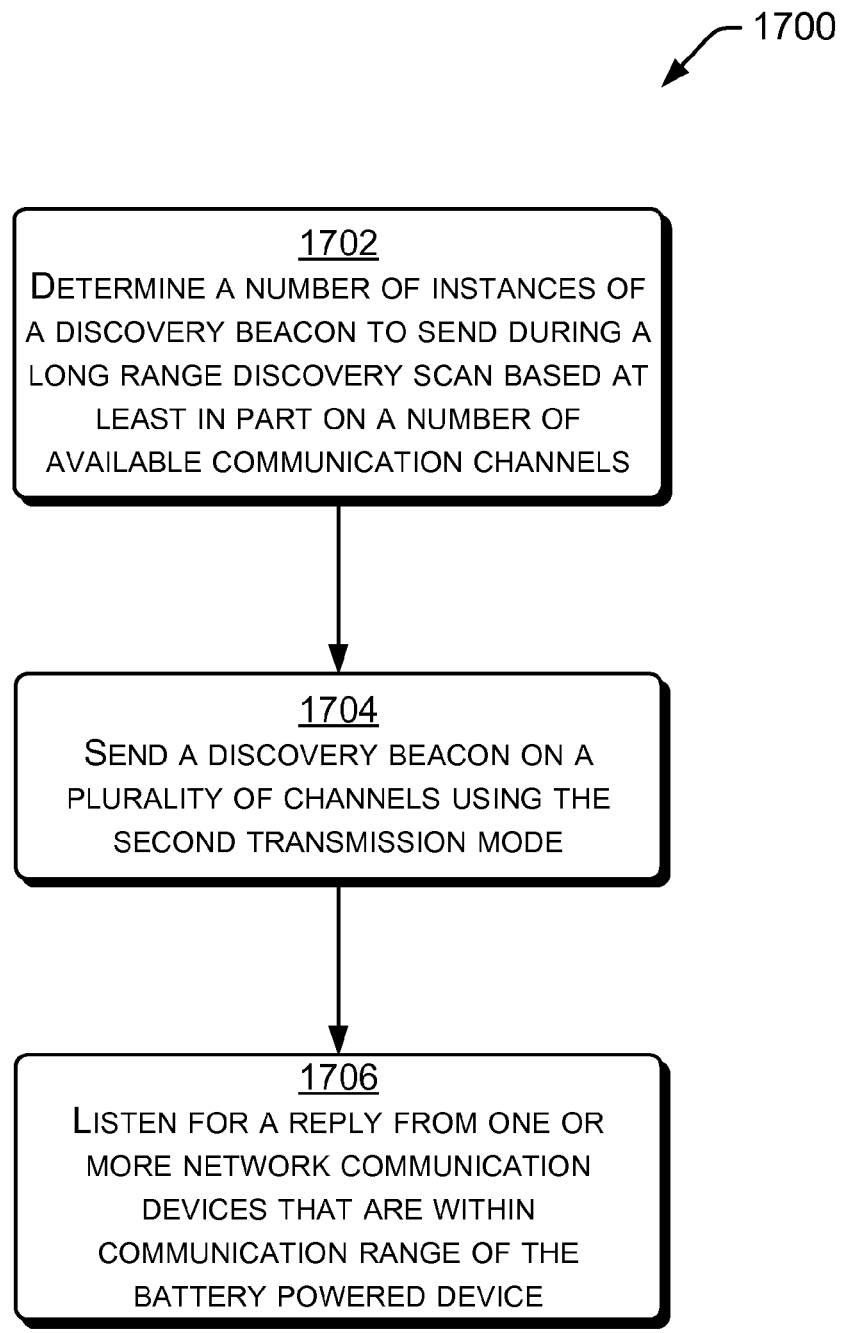
FIG. 17 is a flowchart showing example aspects of node discovery within a network.

FIG. 17 shows example aspects of operation of a network node, such as a battery powered device (e.g., battery powered device 200B of FIG. 2B). The operation may include techniques 1700 for use with long-range discovery processes, wherein the battery powered device attempts to discover other nodes on a network. Such other nodes may facilitate network communication, become a parent node to the battery powered device and/or may help the battery powered device to migrate to a different area network (AN). The techniques 1700 also address issues including a number of discovery beacons to be sent and how that is determined, a transmission mode to be used, and obtaining a reply from other network devices.

At block 1702, a number of instances of a discovery beacon to send during a long range discovery scan is determined. The discovery beacons may be sent by a battery powered network device. In one example, the number of instances may be based at least in part on a number of available communication channels.

At block 1704, the discovery beacon may be sent on a plurality of channels using a second transmission mode. The transmission may be made by the battery powered device, and may be repeated as indicate by the number of instances.

At block 1706, the battery powered device may listen for a reply (to the discovery beacon) from one or more network communication devices that are within communication range of the battery powered device.

Figure 18:
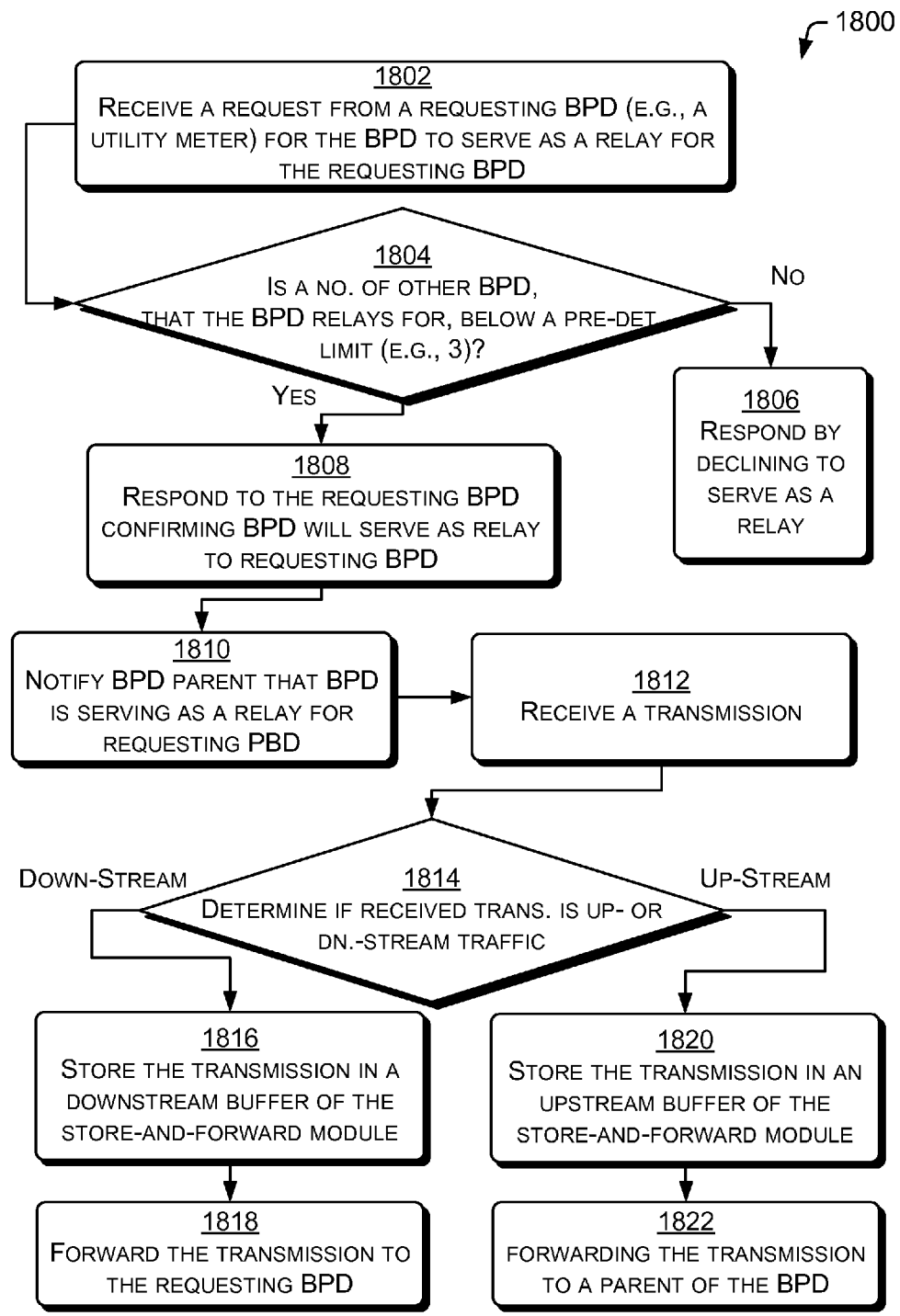
FIG. 18 is a flowchart showing example aspects relaying data in both upstream and downstream directions.

FIG. 18 shows example aspects of operation of a network node, such as a battery powered device (e.g., battery powered device 200B of FIG. 2B). The operation may include techniques 1800 for use by a battery powered device that receives a request from another battery powered device. According to the techniques, the receiving battery powered device may determine if it is suited to relay messages for the other battery powered device. The techniques also address aspects of how the receiving battery powered device may handle upstream and downstream packet transmissions as a relay for the other battery powered device.

At block 1802, a request may be received, at a battery powered device (receiving BPD), from a requesting BPD (e.g., a utility meter) for the receiving BPD to serve as a relay for the requesting BPD. In the example of FIG. 1, the BPD relay 104(2) may have received such a request from the device 104(N).

At block 1804, the receiving battery powered device determines if a number of other BPD, for which the receiving BPD is currently a relay, is below a predetermined limit. The limit could be any number (e.g., three) of BPDs, and could be based in part on the need to maintain a manageable load on the receiving BPD's battery.

At block 1806, if the receiving BPD is already a relay for a threshold or limiting number of other BPDs, then the receiving BPD may decline to serve as a relay for the requesting BPD.

Alternatively at block 1808, if the receiving BPD is not already serving as a relay for the limiting number of other BPDs, the receiving BPD may respond to the requesting BPD and confirm that it will serve as relay to requesting BPD.

At block 1810, the receiving BPD may notify its parent that BPD is serving as a relay for requesting PBD. In the example of FIG. 1, the BPD relay 104(2) may agree to relay for the device 104(N). It may then notify its parent device, the mains powered device 102(M).

At block 1812, the receiving BPD receives a transmission. At block 1814, the BPD then determines if received transmission is upstream or downstream traffic. This determination may be based on addressing or other indication in the packet header, or other factor(s) depending on the network.

At block 1816, if the packet is downstream traffic, the transmission may be stored in a downstream buffer of the store-and-forward module. In the example of FIG. 2, the store/forward module 222 may process the received packet. By storing the packet, it may be held until a more opportune time for forwarding. This may allow more efficient use of the BPD's radio, processor and battery. In the example of FIG. 13, the store and forward module includes both upstream and downstream buffers, which may be used to store upstream and downstream packets, respectively. At block 1818, at an appropriate time, the stored downstream transmission may be forwarded to the requesting BPD.

At block 1820, the upstream transmission may be stored in an upstream buffer of the store-and-forward module. At block 1822, at an appropriate time, the stored upstream transmission may be forwarded to the requesting BPD.

Figure 19:
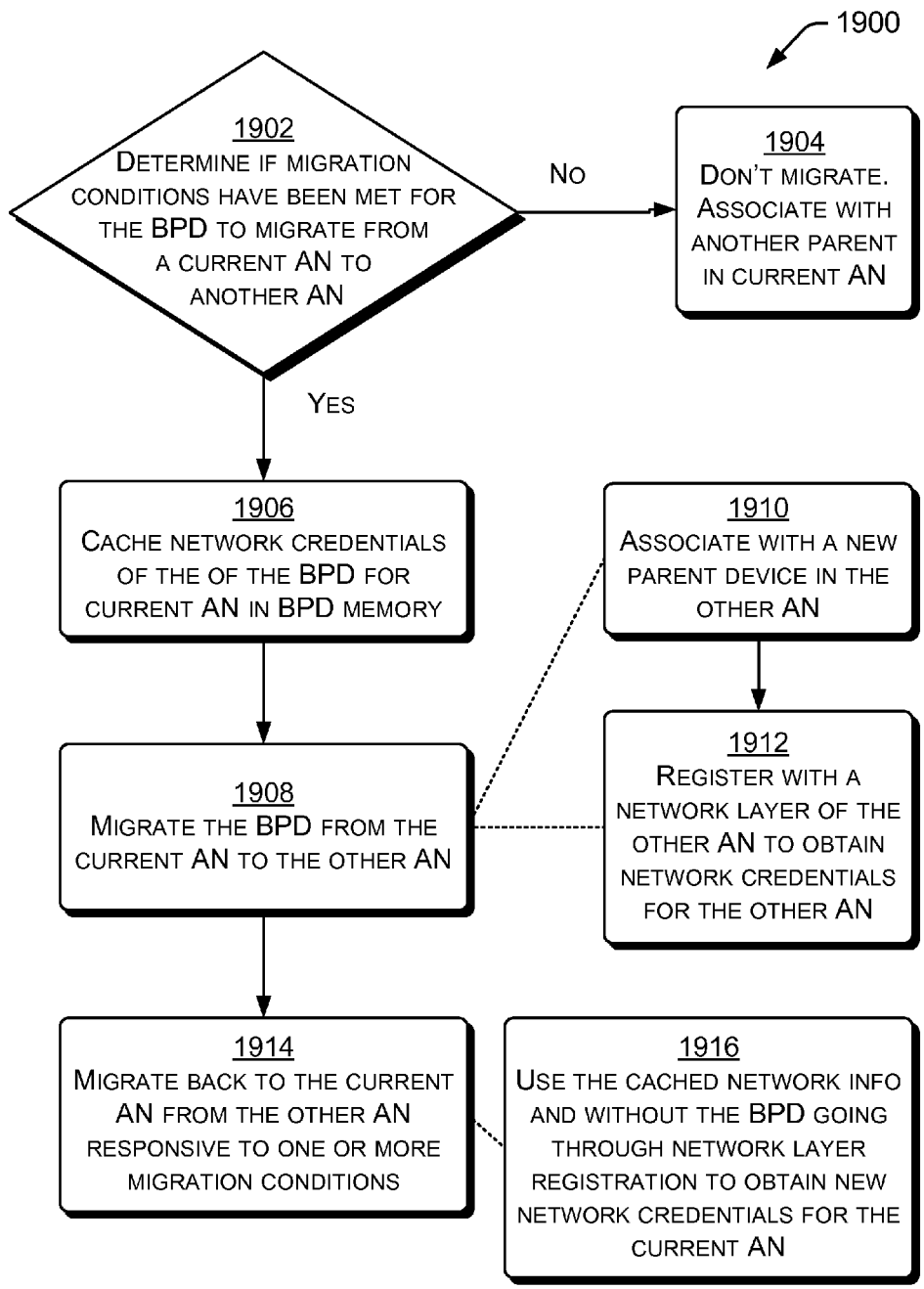
FIG. 19 is a flowchart showing example aspects for migrating a node from one area network to another area network.

FIG. 19 shows example aspects of operation of a network node, such as a battery powered device (e.g., battery powered device 200B of FIG. 2B). The operation may include techniques 1900 for use by a battery powered device to determine if it should migrate from one area network (AN) to another AN.

At block 1902, a BPD may determine if migration conditions have been met for the BPD to migrate from a current AN to another AN. If the migration conditions are not met, at block 1904 the BPD determines that is will not migrate, and will instead associated with another parent node in the current AN.

However, if the migration conditions are met, at block 1906 the BPD may cache the network credentials used by the BPD in the current AN in BPD's memory. By caching the current AN credentials, the BPD will more easily be able to migrate back to the current AN at a later time, if required.

At block 1908, the BPD migrates from the current AN to the other AN. Blocks 1910 and 1912 provide examples of optional techniques by which the migration may be performed. At block 1910, the BPD may associate with a new parent device in the new AN. The new parent device may have been located based on the short- and/or long-ranges scans of FIGS. 16 and/or 17, or by other techniques. At block 1912, the BPD may register with one or more network layers of the new AN to obtain network credentials in that ARA.

At block 1914, under some conditions, the BPD may migrate back to the original AN from the new AN. This second migration may be responsive to one or more migration conditions. At block 1916, the BPD may use the previously cached network information during the second migration. Accordingly, the BPD may not go through network layer registration to obtain new network credentials for the original AN.

Example Operational Usage

Figure 20:
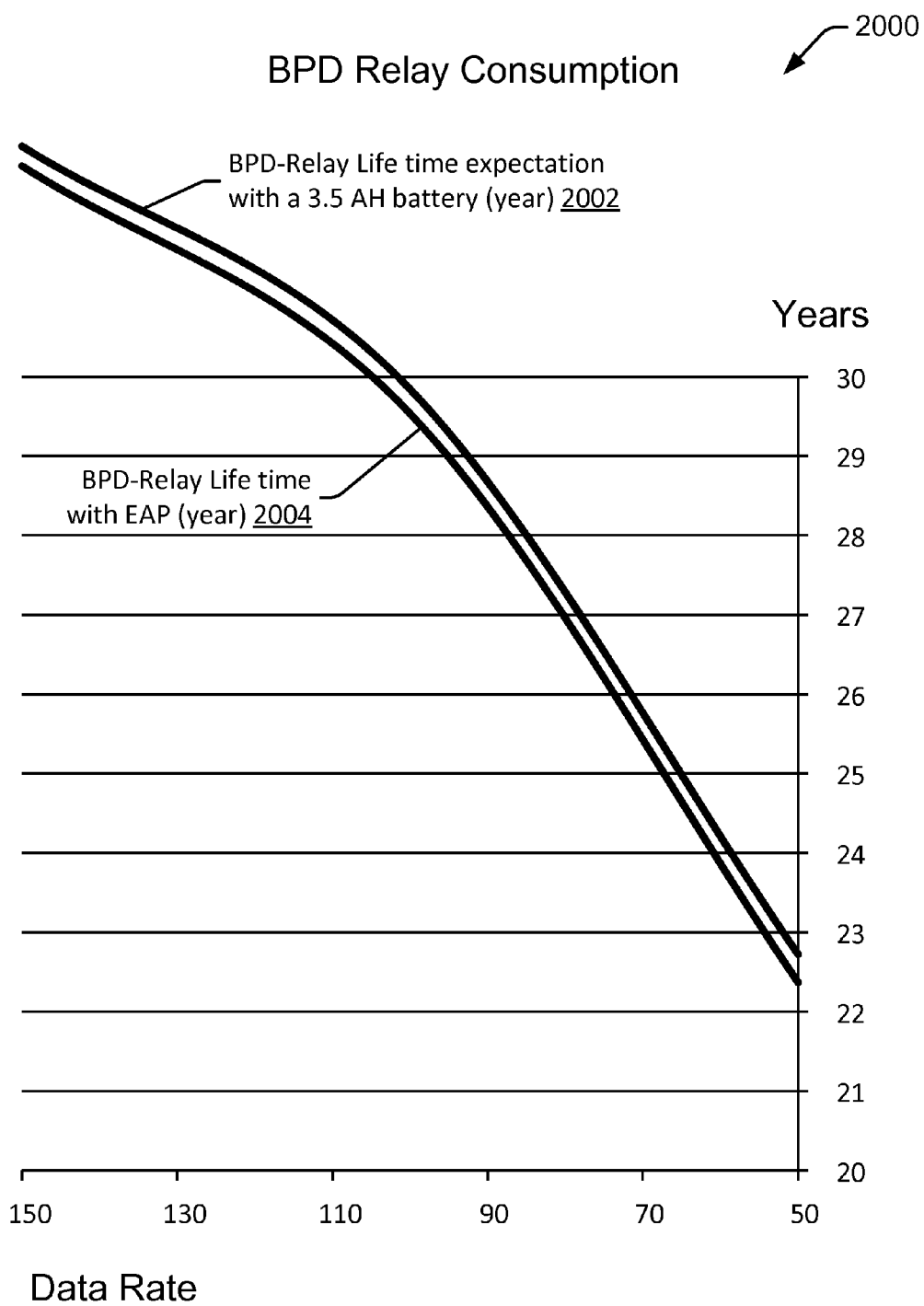
FIG. 20 is a graph describing an example relationship between battery power consumption and transmission data rate.

FIG. 20 is a graph describing an example relationship 2000 between battery power consumption and transmission data rate. In particular, battery life expectancy (in years) of a battery powered device (BPD) in a network decreases markedly as data rate slows, and the node is powered up for longer periods of time. Accordingly, better network connections with higher baud rates may result in longer battery life. In the example shown, two different BPDs 2002 and 2004 experience a similar decrease in battery life expectancy as transmission kilobits per second decrease.

Figure 21:
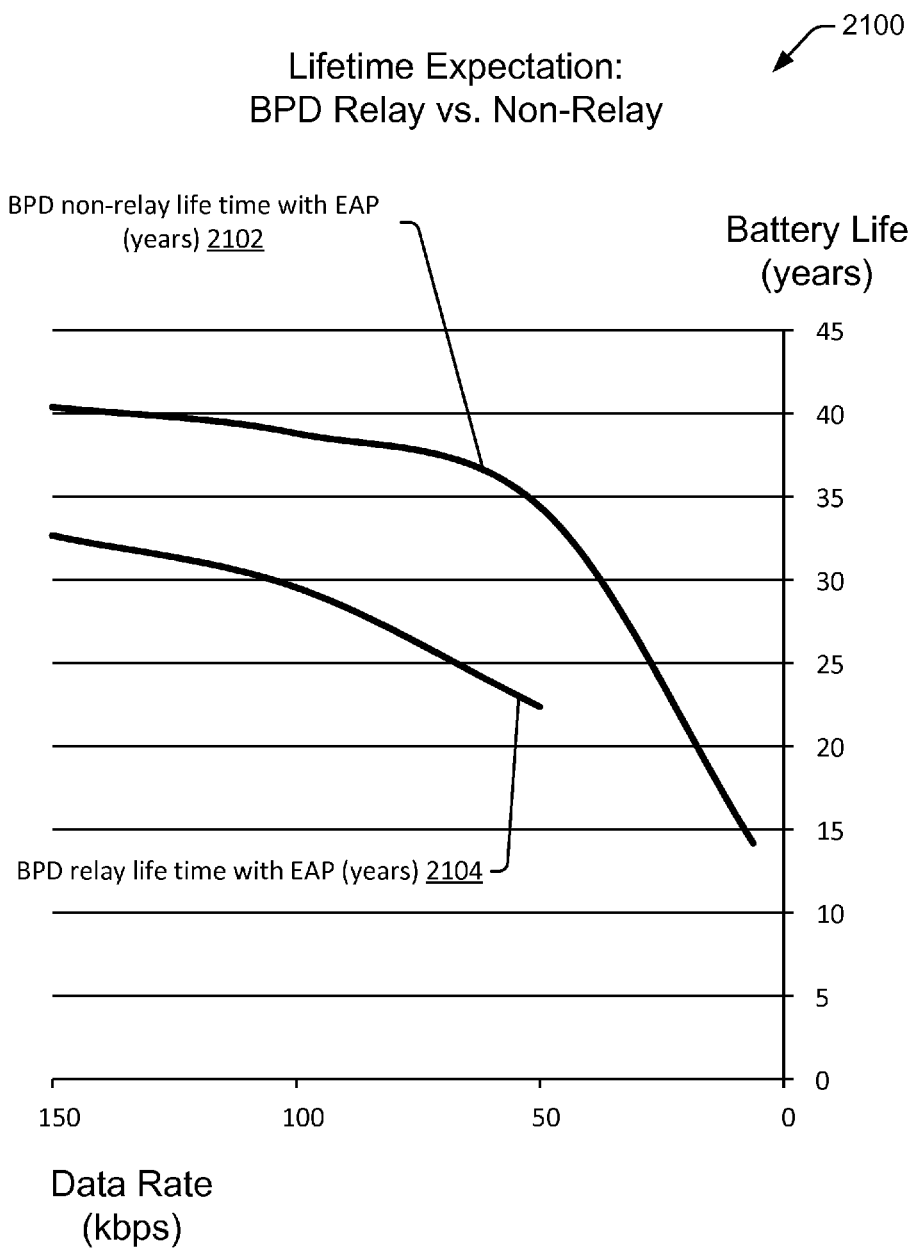
FIG. 21 is a graph describing an example relationship between battery life expectancy of a BPD acting as a relay and a BPD not acting as a relay.

FIG. 21 is a graph describing an example relationship 2100 between battery life expectancy (in years) of a battery powered device acting as a relay, line 2104, and a battery powered device not acting as a relay, line 2102. In the example shown, a non-relay BPD has substantially longer battery life, while a BPD used as a relay has lower battery life. As transmission speed decreases (and the BPD is therefore operational for longer periods) the battery life decreases.

Figure 22:
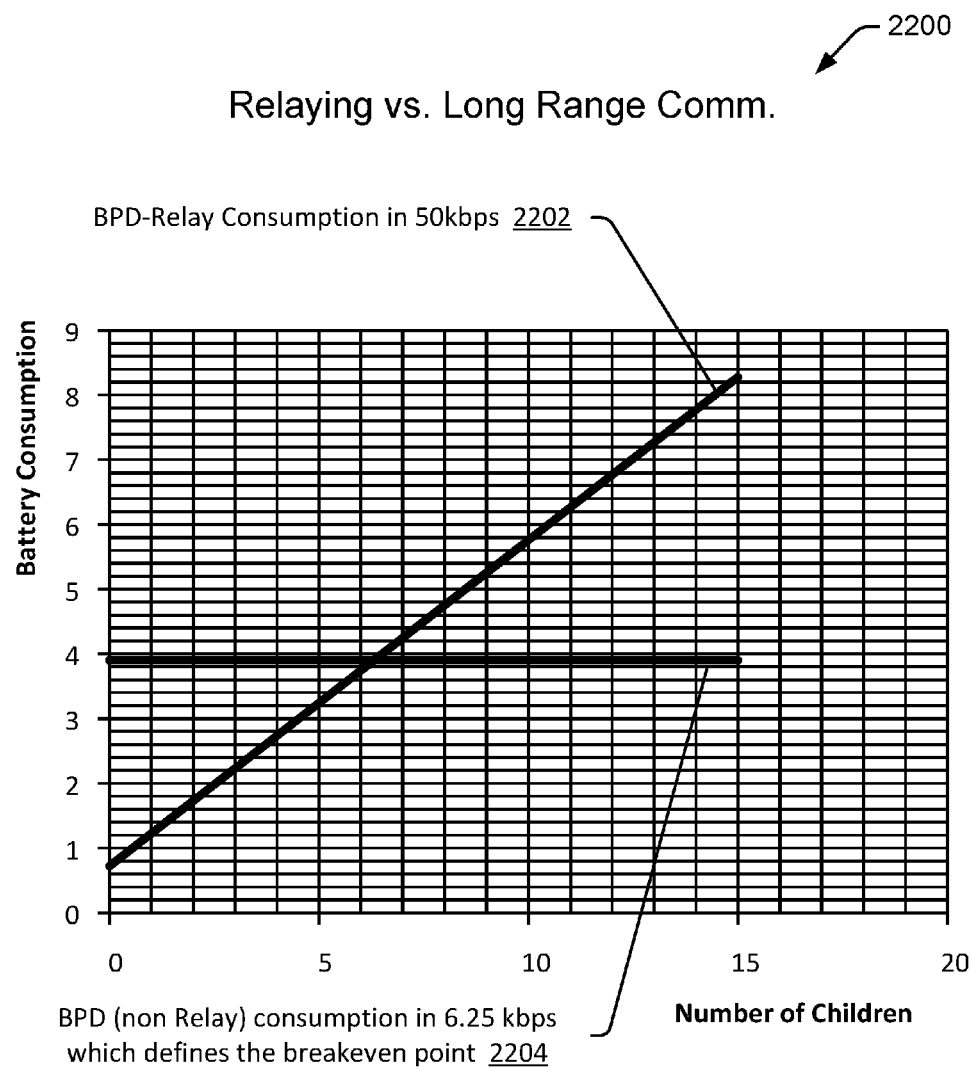
FIG. 22 is a graph describing an example relationship in battery power use between techniques utilizing relaying of messages and techniques utilizing long range transmissions.

FIG. 22 is a graph describing an example relationship 2200 in battery power use between techniques utilizing relaying of messages and techniques utilizing long range transmissions. A BPD 2202 utilizes message-relaying techniques, and experiences greater battery consumption with increasing number of node-children requiring relay services. A BPD 2204 utilizes long-range transmissions to avoid relay conditions. The BPD 2202 and 2204 will experience similar battery consumption (i.e., a breakeven point) at a 6.25 kbps transmission rate.

Figure 23:
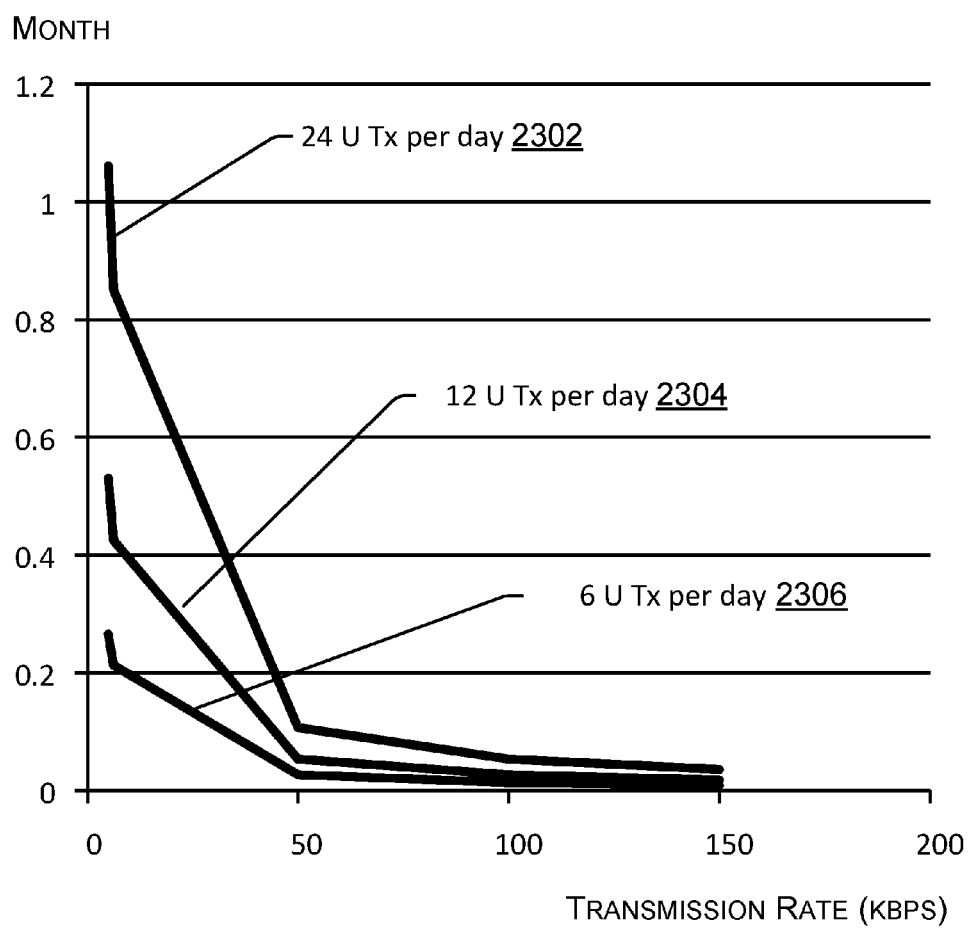
FIG. 23 is a graph describing impact of RTS/CTS on transmissions per day.

FIG. 23 is a graph 2300 describing an example impact of RTS/CTS on networks having different numbers of timeslots per day. As the transmission rate (e.g., in kilobits per second, kbps) increases, three different BPDs 2302, 2304, 2306 experience more similar RTS/CTS impact.

Example Implementations

A number of representative and/or example implementations are discussed below. These examples are not an exhaustive or complete catalog of the techniques discussed herein, but are evocative of their structure and operation.

In one example, a battery powered device includes a battery, one or more processors electrically coupled to the battery, and a memory device storing instructions executable by the one or more processors to perform one or more operations. In the example, the operations may include performing a short range discovery scan to search for network communication devices that are within communication range of the battery powered device (which may be performed using a first transmission mode having a first data rate), determining that no reply has been received in response to the short range discovery scan, and performing a long range discovery scan for network communication devices that are within communication range of the battery powered device (which may be performed using a second transmission mode). In one example, the second transmission mode may have a transmission range longer than the short range discovery scan, and may be performed at a second data rate, which is lower than the first data rate.

The battery powered device may perform, separately or together with any of the above examples where consistent, a short range discovery scan. The scan may include sending a first instance of a discovery beacon on a plurality of channels using the first transmission mode, sending a second instance of the discovery beacon on the plurality of channels using the first transmission mode, and after sending the first and second instances of the discovery beacon on the plurality of channels using the first transmission mode, listening for a reply from one or more network communication devices that are within communication range of the battery powered device.

The battery powered device may perform, separately or together with any of the above examples where consistent, techniques performed prior to performing the short range discovery scan. The activity may include receiving synchronization information for a network of which one or more network communication devices are within communication range of the battery powered device. In one example, the short range discovery scan may be performed by sending a discovery beacon on a current control channel of the network.

The battery powered device may perform, separately or together with any of the above examples where consistent, techniques prior to performing the long range discovery scan. The activity may include repeating the short range discovery scan until receipt of a reply from one or more network communication devices that are within communication range of the battery powered device or the short range discovery scan has been performed a predetermined threshold number of times.

The battery powered device may perform techniques, separately or together with any of the above examples where consistent, to determine a number of instances of a discovery beacon to send during a long range discovery scan. The determination may be based at least in part on a number of available communication channels.

The battery powered device may perform, separately or together with any of the above examples where consistent, techniques in the course of the long range discovery scan, which may include sending a discovery beacon on a plurality of channels using the second transmission mode, and after sending the discovery beacon on the plurality of channels using the second transmission mode, listening for a reply from one or more network communication devices that are within communication range of the battery powered device.

The battery powered device may utilize, separately or together with any of the above examples where consistent, a data rate of about 50 kilobytes per second (kbps) for the first data rate, and a data rate of at most about 10 kbps for the second data rate.

108 The battery powered device may be, or may be associated with, in a manner that is separate or together with any of the above examples where consistent, a utility meter.

In one example, a method may be implemented at least in part by a battery powered device. In the example, two unassisted scans may be performed for each discovery iteration (TSDI). The example method may include techniques including performing a discovery scan to search for network communication devices that are within communication range of the battery powered device. The discovery scan may include sending a first instance of a discovery beacon on a plurality of channels, sending a second instance of the discovery beacon on the plurality of channels, and after sending the first and second instances of the discovery beacon on the plurality of channels, listening for a reply from one or more other devices. In one example, the process is an unassisted discovery. In this example, the discovery scan is performed by the battery powered device without knowledge of a current control channel of network communication devices that are within communication range of the battery powered device.

A method may include, separately or together with any of the above examples where consistent, a discovery beacon having a reply channel on which the battery powered endpoint will listen for one or more replies and a reply time at which the battery powered endpoint will listen for the one or more replies.

A method may include, separately or together with any of the above examples where consistent, listening for the one or more replies by monitoring the reply channel at the reply time specified in the discovery beacon. In one example, the discovery beacon is at most 18 bytes in size.

A method may include, separately or together with any of the above examples where consistent, repeating performance of the discovery scan until receipt of a reply from one or more network communication devices that are within communication range of the battery powered device, or completion of the discovery scan a predetermined number of times.

A method may include, separately or together with any of the above examples where consistent, a discovery scan that includes a short range transmission mode having a first data rate, and further, performance of another discovery scan using a long range transmission mode. In an example, the long range transmission mode may have a transmission range longer than the short range transmission mode, and a second data rate, the second data rate being lower than the first data rate.

A method may include, separately or together with any of the above examples where consistent, receiving a reply (which may include synchronization information) from a network communication device that is within communication range of the battery powered device, and joining a network of which the network communication device is a part using the synchronization information.

A method may include, separately or together with any of the above examples where consistent, light discover after discovering a parent. The discovery may include the techniques of determining, from the synchronization information, a current control channel of the network, periodically sending a discovery beacon on the current control channel of the network to discover other network communication devices in a vicinity of the battery powered device, and adding discovered network communication devices in a vicinity of the battery powered device to a neighbor list maintained by the battery powered device.

A method may include, separately or together with any of the above examples where consistent, techniques for joining the network, including sending an acknowledgement to the network communication device acknowledging receipt of the reply and receiving synchronization information from the network communication device. The synchronization information may include an indication of a current control channel of a network of which the network communication device is a part, and/or a coordinated universal time of the network. The techniques may also include selecting the network communication device as the parent of the battery powered device, sending an association request to the network communication device, and receiving an association response from the network commination device.

A method may include, separately or together with any of the above examples where consistent, authenticating the battery powered device to a network. From the battery powered device perspective, the authenticating may include receiving an access acceptance message indicating that the battery powered device is authenticated to the network, the access acceptance message including the network ID (e.g., PAN ID), and generating an internet protocol (IP address) from the network ID and an identifier (e.g., MAC ID) of the battery powered device (allows the battery powered device to obtain an IP address without going through DHCPv6 acquisition process).

A method may include, separately or together with any of the above examples where consistent, that the battery powered device comprises or is associated with a utility meter. An example battery powered device may include a battery, one or more processors electrically coupled to the battery, and a memory device storing instructions that when executed by the one or more processors cause the one or more processors to perform one or more of the methods above. Additionally, the device may include one or more computer-readable media storing instructions, that when executed by one or more processors, cause the one or more processors to perform one or more of the methods discussed herein.

In one example, one or more computer-readable media may store instructions that, when executed by one or more processors of a battery powered device, configure the one or more processors to perform operations that may include determining whether synchronization information is available for a network of which one or more network communication devices are within communication range of the battery powered device, selecting a discovery scan mode to use from among multiple discovery scan modes based at least in part on the determination of whether synchronization information is available for the network, and performing the selected discovery scan mode to identify one or more network communication devices that are within communication range of the battery powered device.

The computer-readable media and/or stored instructions may include, separately or together with any of the above examples where consistent, instructions such that the determining determines that synchronization information is available for the network, the selecting selects an assisted discovery mode that employs the available synchronization information, and the performing comprises determining a current control channel of the network based at least in part on the available synchronization information, and sending a discovery beacon on the current control channel of the network.

The computer-readable media and/or stored instructions may include, separately or together with any of the above examples where consistent, instructions such that the synchronization information is received by the battery powered device from a mobile device of an administrator installing or servicing the battery powered device.

The computer-readable media and/or stored instructions may include, separately or together with any of the above examples where consistent, instructions such that the determining determines that synchronization information is not available for the network, and the selecting selects an unassisted discovery mode. The performing may include sending a first instance of a discovery beacon on a plurality of channels and sending a second instance of the discovery beacon on the plurality of channels. Additionally, after sending the first and second instances of the discovery beacon on the plurality of channels, the instructions may include listening for a reply from one or more network communication devices that are within communication range of the battery powered device.

The computer-readable media and/or stored instructions may include, separately or together with any of the above examples where consistent, instructions such that performing the selected discovery scan includes performing the selected discovery scan using a short range transmission mode having a first data rate, determining that no response has been received to the selected discovery scan using the short range transmission mode and performing the selected discovery scan using a long range transmission mode. The long range transmission mode may have a longer transmission range than the short range transmission mode, and a second data rate, the second data rate being lower than the first data rate.

The computer-readable media and/or stored instructions may include, separately or together with any of the above examples where consistent, instructions for receiving a reply from one or more network communication devices that are within communication range of the battery powered device, the reply including information for the battery powered device to join the network, and joining the network using the information included in the reply.

In one example, a method may be implemented at least in part by a battery powered device. The method may include techniques, including performing a short range discovery scan using a first transmission mode having a first data rate, determining that no reply has been received in response to the short range discovery scan, and performing a long range discovery scan using a second transmission mode. The second transmission mode may have longer transmission range than the first transmission mode, and a second data rate which is lower than the first data rate. The method may also include receiving a reply from a mains powered device, the reply including synchronization information, and performing a targeted short range discovery scan on a control channel that, based at least in part on the synchronization information, is a current control channel of one or more neighboring battery powered devices in a vicinity of the battery powered device.

A method may also include, separately or together with any of the above examples where consistent, receiving a response to the targeted short range discovery scan from one or more neighboring battery powered devices, adding the one or more neighboring battery powered devices from which the response was received to a neighbor list, and designating one of the one or more neighboring devices from which the response was received as a parent to serve as a battery powered relay for the battery powered device.

A method may also include, separately or together with any of the above examples where consistent, determining that a response to the targeted short range discovery scan has not been received, and designating the mains powered device to serve as a parent for the battery powered device.

A method may include, separately or together with any of the above examples where consistent, a first data rate of at least about 50 kilobytes per second (kbps) and a second data rate comprises at most about 10 kbps.

A method may be configured, separately or together with any of the above examples where consistent, such that the mains powered device is an electricity meter and the battery powered device is, or is associated with, a water meter or a gas meter.

A method may be performed, in a manner separately or together with any of the above examples where consistent, by a battery powered device comprising a battery, one or more processors electrically coupled to the battery, and memory storing instructions that when executed by the one or more processors cause the one or more processors to perform method(s).

In one example, a battery powered device may include a battery, one or more processors electrically coupled to the battery, and memory storing instructions executable by the one or more processors to perform various operations. Example operations may include receiving a request from a requesting battery powered device for the battery powered device to serve as a relay for the requesting battery powered device, determining that a number of other battery powered devices for which the battery powered device serves as a relay is below a predetermined limit, and responding to the requesting battery powered device confirming that the battery powered device will serve as a relay for the requesting battery powered device.

The battery powered device may include, separately or together with any of the above examples where consistent, further operations including sending a notification to a parent of the battery powered device that the battery powered device is serving as a relay for the requesting battery powered device.

The battery powered device may include, separately or together with any of the above examples where consistent, a store-and-forward module stored in the memory, the store-and-forward module to store transmissions to and/or from the requesting battery powered device prior to forwarding the transmissions.

The battery powered device may include, separately or together with any of the above examples where consistent, additional operations including receiving a transmission from a parent of the battery powered device intended for the requesting battery powered device, storing the transmission in the store-and-forward module, and forwarding the transmission to the requesting battery powered device. The forwarding may be based at least on a schedule of communication time slots with the requesting battery powered device, a duty cycle imposed by characteristics of the battery of the battery powered device, and a class of information contained in the transmission.

The battery powered device may include, separately or together with any of the above examples where consistent, further operations including receiving a transmission from the requesting battery powered device, storing the transmission in the store-and-forward module, and forwarding the transmission to a parent of the battery powered device. The forwarding may be based at least on a duty cycle imposed by characteristics of the battery of the battery powered device, a class of information contained in the transmission, and a queue of other packets originating locally and/or from other battery powered devices for which the battery powered device serves as a relay.

The battery powered device may include, separately or together with any of the above examples where consistent, limitations on how often the battery powered device transmits, based at least in part on characteristics of the battery. In an example, the transmission limitations may specifying that during network discovery, the battery powered device is limited to a duty cycle of at most 25%, and during periods other than network discovery, the battery powered device is permitted to transmit for at most 120 milliseconds at a time with at least a 10 second recovery period between consecutive transmissions.

The battery powered device may include, separately or together with any of the above examples where consistent, a predetermined limit on how many other battery powered devices the battery powered device is permitted to serve as a relay, which may be limited to at most three other devices.

The battery powered device may include, separately or together with any of the above examples where consistent, configurations such that the battery powered device communicates with the requesting battery powered device and a parent network communication device using a transmission mode having a data rate of at least 50 kilobytes per second (kbps).

The battery powered device may, separately or together with any of the above examples where consistent, be or is associated with, a utility meter.

In one example, one or more computer-readable media may store instructions that, when executed by one or more processors of a mains powered device, configure the one or more processors to perform operations including receiving a discovery beacon from a battery powered device using a long range transmission mode having a first data rate, sending a reply to the battery powered device using the long range transmission mode, the reply including synchronization information of a network, and sending a notification to one or more other battery powered devices of the network that are children of the mains powered device. The notification may be sent using a short range transmission mode having a second data rate, which is higher than the first data rate, the notification instructing the children of the mains powered device to listen for a discovery beacon from the battery powered device.

The one or more computer-readable media and/or instructions, separately or together with any of the above examples where consistent, may be configured such that the synchronization information includes a current control channel used by the network and/or a coordinated universal time of the network.

The one or more computer-readable media and/or instructions, separately or together with any of the above examples where consistent, may be configured such that the notification includes an indication of a time at which to listen for the discovery beacon from the battery powered device.

The one or more computer-readable media and/or instructions may include, separately or together with any of the above examples where consistent, may be configured for receiving a notification from one of the children of the mains powered device indicating that it is serving as a relay for the battery powered device.

The one or more computer-readable media and/or instructions may be configured, separately or together with any of the above examples where consistent, such that the mains powered device comprises or is associated with an electricity meter.

In one example, a method may be implemented at least in part by a network communication device. In the example, the method may include obtaining data to be transmitted to a recipient device, determining whether the recipient device is a battery powered recipient device or a mains powered recipient device, determining a class of information contained in the data, determining a time to transmit the data to the recipient device. The time may be based at least in part on the determination of whether the recipient device is a battery powered recipient device or a mains powered recipient device, and the class of information contained in the data. The method may also include transmitting the data to the recipient device at the determined time.

A method may be configured, separately or together with any of the above examples where consistent, such that the recipient device is determined to be a battery powered recipient device, the class of information contained in the data comprises a command or control instructing the battery powered recipient device to perform an operation, which is given priority over other classes of data, and the time to transmit the data to the battery powered recipient device is prioritized to a next scheduled time slot between the network communication device and the battery powered recipient device.

A method may be configured, separately or together with any of the above examples where consistent, such that the time to transmit the data to the battery powered recipient device is at most 30 seconds after the command or control data is obtained.

A method may be configured, separately or together with any of the above examples where consistent, such that the recipient device is determined to be a battery powered recipient device, the class of information contained in the data comprises information that is to be transmitted in an order that it was received, and the time to transmit the data to the battery powered recipient device comprises a scheduled time slot between the network communication device and the battery powered recipient device that is after command or control data is transmitted and after any previously obtained data has been transmitted.

A method may be configured, separately or together with any of the above examples where consistent, such that the recipient device is determined to be a battery powered recipient device, the class of information contained in the data comprises an alarm, which is given priority over other classes of data, and the time to transmit the data to the battery powered recipient device is prioritized to a next scheduled time slot between the network communication device and the battery powered recipient device.

A method may be configured, separately or together with any of the above examples where consistent, such that the time to transmit the data to the battery powered recipient device is at most 30 seconds after the alarm data is obtained.

A method may be configured, separately or together with any of the above examples where consistent, such that the recipient device is determined to be a mains powered recipient device, the class of information contained in the data comprises an alarm, which is given priority over other classes of data, and the time to transmit the data to the mains powered recipient device is substantially immediately following occurrence of the alarm.

A method may be configured, separately or together with any of the above examples where consistent, such that the class of information contained in the data comprises resource consumption data, and the time to transmit the data to the recipient device is determined in response to receipt of a read request from the recipient device.

A method may include, separately or together with any of the above examples where consistent, storing the data in a store-and-forward module of the network communication device until the determined time to transmit the data to the recipient device.

In one example, a network communication device may include one or more processors, memory communicatively coupled to the one or more processors, a classifier stored in the memory and executable by the one or more processors to perform techniques, including receiving data destined for a recipient device, and determining whether the recipient device is a battery powered recipient device or a mains powered recipient device. The network communication device may also include a store-and-forward module stored in the memory and executable by the one or more processors to perform techniques, including storing received data that is destined for a battery powered recipient device prior to forwarding the data to the battery powered recipient device, and forwarding the data to the recipient device.

The network communication device and/or the store-and-forward module may, separately or together with any of the above examples where consistent, be further executable to determine a class of information contained in the data, and forward the data to the recipient device based further in part on the determined class of information contained in the data.

The network communication device, separately or together with any of the above examples where consistent, may be configured such that the recipient device is determined to be a battery powered recipient device. In the example, the store-and-forward module may be executable to forward the data to the battery powered recipient device based at least on a schedule of communication time slots with the battery powered recipient device, and a class of information contained in the data.

The network communication device, separately or together with any of the above examples where consistent, may be configured as a battery powered device, may determine the recipient device may to be a battery powered recipient device, and the store-and-forward module may be executable to forward the data to the battery powered recipient device based further on a duty cycle imposed by characteristics of a battery of the network communication device.

The network communication device, separately or together with any of the above examples where consistent, may be configured as a battery powered device, and the store-and-forward module may be executable to forward the data to the recipient device based at least on a duty cycle imposed by characteristics of a battery of the network communication device.

The network communication device may be configured, separately or together with any of the above examples where consistent, such that the store-and-forward module is executable to forward the data to the battery powered recipient device based further on at least one of a class of: a class of information contained in the data, and, a queue of other packets originating locally and/or from other battery powered devices for which the network communication device serves as a relay.

The network communication device, separately or together with any of the above examples where consistent, may be configured such that the network communication device comprises or is associated with a utility meter.

In one example, one or more computer-readable media storing instructions that, when executed by one or more processors of a mains powered device, configure the one or more processors to perform operations including receiving data destined for one or more recipient devices, determining whether at least one recipient device is a battery powered recipient device, when none of the one or more recipient devices are battery powered recipient devices, forwarding the data to the one or more recipient devices substantially immediately after receiving the data, and when at least one recipient device of the one or more recipient devices is a battery powered recipient device, storing the data in a store-and-forward module of the mains powered device for subsequent transmission to the one or more recipient devices.

One or more computer-readable media, separately or together with any of the above examples where consistent, may be configured such that when at least one recipient device of the one or more recipient devices is a battery powered recipient device, the operations include notifying the at least one battery powered recipient device to wake to receive the data at a scheduled time slot, and forwarding the data to the at least one battery powered recipient device at the scheduled time slot.

One or more computer-readable media, separately or together with any of the above examples where consistent, may be configured such that the scheduled time is based at least in part on a class of information contained in the data.

One or more computer-readable media, separately or together with any of the above examples where consistent, may be configured such that the class of information contained in the data includes a command or control and the data is prioritized to be transmitted at a time sooner than data other than command or control data.

In one example, a method implemented at least in part by a battery powered device. In the example, the method may include determining that one or more migration conditions have been met for the battery powered device to migrate from a current area network (AN) to another AN, caching network credentials of the battery powered device for the current AN in memory of the battery powered device, and migrating the battery powered device from the current AN to the other AN.

A method, separately or together with any of the above examples where consistent, may configured such that the network credentials cached in the memory comprise an internet protocol (IP) address of the battery powered device on the current AN.

A method, separately or together with any of the above examples where consistent, may be configured such that the network credentials cached in the memory further include an encryption key of the battery powered device on the current AN.

A method, separately or together with any of the above examples where consistent, may be configure such that the one or more migration conditions include a connection with a mains powered parent of the battery powered device is lost, the battery powered device has not discovered another mains powered device in the current AN, and/or the battery powered device has discovered another mains powered device in the other AN that is capable of acting as its parent.

A method, separately or together with any of the above examples where consistent, may be configured such that the one or more migration conditions include the battery powered device receives a disassociation command from its mains powered parent, the battery powered device has not discovered another mains powered device in the current AN, and/or the battery powered device has discovered another mains powered device in the other AN that is capable of acting as its parent.

A method, separately or together with any of the above examples where consistent, may be configured such that the one or more migration conditions include the battery powered device currently has a battery powered relay as its parent, and the battery powered device has discovered a mains powered device in the other AN that is capable of acting as its parent.

A method, separately or together with any of the above examples where consistent, may be configured such that the one or more migration conditions include the battery powered device currently has a battery powered relay as its parent, a connection with the parent of the battery powered device is lost, or the battery powered device receives a disassociation request from the parent of the battery powered device, the battery powered device has not discovered a mains powered device or another battery powered relay in the current AN, and the battery powered device has discovered another battery powered relay in the other AN that is capable of acting as its parent.

A method, separately or together with any of the above examples where consistent, may be configured such that the migrating from the current AN to the other AN includes associating with a new parent device in the other AN, and registering with a network layer of the other AN to obtain network credentials for the other AN.

A method, separately or together with any of the above examples where consistent, may additionally include migrating back to the current AN from the other AN responsive to one or more migration conditions, wherein the migrating back is performed using the cached network credentials and without the battery powered device going through network layer registration to obtain new network credentials for the current AN.

A method, separately or together with any of the above examples where consistent, may be performed by a battery powered device, which may include a battery, one or more processors electrically coupled to the battery, and memory (e.g., one or more memory devices) storing instructions that when executed by the one or more processors cause the one or more processors to perform one or more of the discussed methods.

In one example, a battery powered device may include a battery, one or more processors electrically coupled to the battery, memory (e.g., one or more memory devices) storing instructions executable by the one or more processors to perform operations including receiving an indication that a parent of the battery powered device is migrating from a current area network (AN) to another AN, independently determining whether or not to migrate from the current AN to the other AN. The determining may be based at least in part on availability of other parent devices in the current AN to act as a parent for the battery powered device, and transmission cost to the battery powered device to communicate with other parent devices in the current AN as compared to transmission cost to the battery powered device to communicate with potential parent devices in the other AN.

An example battery powered device, separately or together with any of the above examples where consistent, may be configured such that the independently determining includes determining to migrate to the other AN responsive to determining that at least one of the following migration conditions is met. The conditions may include the battery powered device has not discovered another device in the current AN that is able to serve as a new parent for the battery powered device, and/or transmission cost of all other devices in the current AN that are able to serve as a new parent for the battery powered device is higher than at least one potential parent device in the other AN.

An example battery powered device, separately or together with any of the above examples where consistent, may be configured such that the independently determining comprises determining to remain in the current AN responsive to determining that one or more other devices exist in the current AN that are capable of serving as a new parent of the battery powered device and transmission cost of communicating with the one or more other devices in the current AN that are capable of serving as the new parent of the battery powered device is less than or equal to transmission cost of communicating with potential parent devices in the other AN.

An example battery powered device, separately or together with any of the above examples where consistent, may be configured such that the independently determining comprises determining to migrate, and the operations further include caching network credentials of the battery powered device for the current AN in the memory prior to migration, and migrating the battery powered device from the current AN to the other AN.

An example battery powered device, separately or together with any of the above examples where consistent, may be configured such that the network credentials cached in the memory includes an internet protocol (IP) address of the battery powered device on the current AN and an encryption key of the battery powered device on the current AN.

An example battery powered device, separately or together with any of the above examples where consistent, may be configured such that the migrating the battery powered device from the current AN to the other AN includes associating with a parent device in the other AN, and registering with a network layer of the other AN to obtain network credentials for the other AN.

An example battery powered device, separately or together with any of the above examples where consistent, may include further operations including caching network credentials of the battery powered device for the other AN, and migrating back to the current AN from the other AN responsive to one or more migration conditions, wherein the migrating back is performed using the cached network credentials of the of the battery powered device for the current AN and without the battery powered device going through network layer registration to obtain new network credentials for the current AN.

In one example, one or more computer-readable media may be configured to store migration conditions under which a battery powered device is to migrate from a current area network (AN) to another AN. The migration conditions may include a connection with a mains powered parent of the battery powered device is lost, the battery powered device has not discovered another mains powered device in the current AN, and the battery powered device has discovered another mains powered parent the other AN, the battery powered device receives a disassociation command from a mains powered parent, the battery powered device has not discovered another mains powered device in the current AN, and the battery powered device has discovered another mains powered parent in the other AN, the battery powered device currently has a battery powered relay as its parent, and the battery powered device has discovered a mains powered device in the other AN that is capable of acting as its parent, and the battery powered device currently has a battery powered relay as its parent, a connection with the parent of the battery powered device is lost or the battery powered device receives a disassociation request from the parent of the battery powered device, the battery powered device has not discovered another mains powered device or another battery powered relay in the current AN, the battery powered device has discovered another battery powered relay in the other AN. The one or more computer readable media may further store instructions that, when executed by one or more processors of the battery powered device, configure the one or more processors to perform operations including determining whether or not to migrate from the current AN to the other AN based at least in part on the migration conditions.

The one or more computer-readable media, separately or together with any of the above examples where consistent, may be configured such that the determining whether or not to migrate comprises determining to migrate. The operations may further include caching network credentials of the battery powered device for the current AN in the memory prior to migration, and migrating the battery powered device from the current AN to the other AN.

The one or more computer-readable media, separately or together with any of the above examples where consistent, may be configured such that the network credentials cached in the memory include an internet protocol (IP) address of the battery powered device on the current AN and an encryption key of the battery powered device on the current AN.

CONCLUSION

Although the disclosure describes embodiments having specific structural features and/or methodological acts, it is to be understood that the claims are not necessarily limited to the specific features or acts described. Rather, the specific features and acts are merely illustrative some embodiments that fall within the scope of the claims of the disclosure.

What is claimed is:

1. A method implemented at least in part by a battery powered device, the method comprising:
    performing a short range discovery scan using a first transmission mode having a first data rate;
    determining that no reply has been received in response to the short range discovery scan;
    performing a long range discovery scan using a second transmission mode having:
        longer transmission range than the first transmission mode, and
        a second data rate which is lower than the first data rate, wherein the first data rate comprises at least 50 kilobytes per second (kbps) and the second data rate comprises at most 10 kbps;
    receiving a reply from a mains powered device, the reply including synchronization information;
    performing a targeted short range discovery scan on a control channel that, based at least in part on the synchronization information, is a current control channel of one or more neighboring battery powered devices in a vicinity of the battery powered device;
    determining that a response to the targeted short range discovery scan has been received; and
    designating the mains powered device to serve as a parent for the battery powered device.

2. The method of claim 1, wherein the mains powered device comprises an electricity meter and the battery powered device comprises, or is associated with, a water meter or a gas meter.

3. A battery powered device comprising a battery, one or more processors electrically coupled to the battery, and memory storing instructions that when executed by the one or more processors cause the one or more processors to perform the method of claim 1.

4. One or more computer-readable media storing instructions that, when executed by one or more processors of a battery-powered device (BPD), configure the one or more processors to perform operations comprising:
    determining if migration conditions have been met for the BPD to migrate from a first network to a second network;
    responsive to determining that the migration conditions have been met, caching network credentials for the first network in memory of the BPD;
    migrating the BPD from the first network to the second network by actions comprising:
        sending a discovery beacon from the BPD using a long-range transmission mode having a first data rate;
        receiving a reply from a mains-powered device (MPD) using the long-range transmission mode, the reply including synchronization information of the second network;
        sending a notification to one or more other battery powered devices of the second network that are children of the MPD, the notification being sent using a short-range transmission mode having a second data rate, which is higher than the first data rate, the notification instructing the children of the MPD to monitor for a discovery beacon from the BPD;
        determining that the discovery beacon has not been received; and
        using the cached network credentials of the first network to migrate the BPD back to the first network from the second network without the BPD going through network layer registration to obtain network credentials for the first network.

5. The one or more computer-readable media of claim 4, wherein the synchronization information includes a control channel used by the second network and/or a coordinated universal time of the second network.

6. The one or more computer-readable media of claim 4, wherein the notification includes an indication of a time at which to monitor for the discovery beacon from the BPD.

7. The one or more computer-readable media of claim 4, further comprising receiving a notification from one of the children of the MPD indicating that it is serving as a relay for the BPD.

8. The one or more computer-readable media of claim 4, wherein the MPD comprises or is associated with an electricity meter.

9. The one or more computer-readable media of claim 4, wherein the MPD comprises an electricity meter and the BPD comprises, or is associated with, a water meter or a gas meter.

10. The one or more computer-readable media of claim 4, wherein the synchronization information includes a control channel used by the second network and/or a coordinated universal time of the second network.

11. A method implemented at least in part by a mains powered device, the method comprising:
    receiving a discovery beacon from a battery powered device that was sent using a long-range transmission mode having a first data rate;
    sending a reply to the battery powered device using the long-range transmission mode, the reply including synchronization information of a network;
    sending a notification to one or more other battery-powered devices of the network that are children of the mains powered device, the notification being sent using a short-range transmission mode having a second data rate, which is higher than the first data rate, wherein the first data rate comprises at least 50 kilobytes per second (kbps) and the second data rate comprises at most 10 kbps, the notification instructing the children of the mains-powered device to monitor for a second discovery beacon from the battery powered device;
    determining that the second discovery beacon has not been received; and utilizing the mains powered device as a parent for the battery powered device.

12. The method of claim 11, wherein the synchronization information includes a current control channel used by the network and/or a coordinated universal time of the network.

13. The method of claim 11, wherein the notification includes an indication of a time at which to monitor for the discovery beacon from the battery-powered device.

14. The method of claim 11, further comprising receiving a notification from one of the children of the mains-powered device indicating that it is serving as a relay for the battery-powered device.

15. The method of claim 11, wherein the mains-powered device comprises, or is associated with, an electricity meter.

16. The method of claim 11, wherein the mains-powered device comprises an electricity meter and the battery-powered device comprises a water meter or a gas meter.

* * * * *